(12) United States Patent
Miyazono et al.

(10) Patent No.: US 10,684,456 B2
(45) Date of Patent: Jun. 16, 2020

(54) MICROSCOPE

(71) Applicant: OLYMPUS CORPORATION, Hachioji-shi, Tokyo (JP)

(72) Inventors: Yuya Miyazono, Hamburg (DE); Tatsuo Nakata, Tokyo (JP); Kenichi Kusaka, Brookline, MA (US)

(73) Assignee: OLYMPUS CORPORATION, Tokyo (JP)

( * ) Notice: Subject to any disclaimer, the term of this patent is extended or adjusted under 35 U.S.C. 154(b) by 520 days.

(21) Appl. No.: 15/292,826

(22) Filed: Oct. 13, 2016

(65) Prior Publication Data

US 2017/0108683 A1  Apr. 20, 2017

(30) Foreign Application Priority Data

Oct. 16, 2015 (JP) .................................. 2015-205089

(51) Int. Cl.
*G02B 21/00* (2006.01)
*G02B 3/14* (2006.01)
(Continued)

(52) U.S. Cl.
CPC ........... *G02B 21/0032* (2013.01); *G02B 3/14* (2013.01); *G02B 21/0044* (2013.01);
(Continued)

(58) Field of Classification Search
CPC .. G02B 21/0032; G02B 3/14; G02B 21/0044; G02B 21/0048; G02B 21/0076;
(Continued)

(56) References Cited

U.S. PATENT DOCUMENTS 3,972,056 A *  7/1976  Tsujimoto .............. G02B 7/282
                                                  396/80
6,404,545 B1 *  6/2002  Ishiwata ............ G02B 21/0044
                                                  359/235
(Continued)

FOREIGN PATENT DOCUMENTS

CN    100570718 C    12/2009
JP    06069926 U      9/1994
(Continued)

OTHER PUBLICATIONS

Benjamin F. Grewe, et al., "Fast two-layer two-photon imaging of neuronal cell populations using an electrically tunable lens", Biomedical Optics Express 2035, vol. 2, No. 7, Jul. 1, 2011, 12 Pages.
(Continued)

*Primary Examiner* — Georgia Y Epps
*Assistant Examiner* — Don J Williams
(74) *Attorney, Agent, or Firm* — Holtz, Holtz & Volek PC

(57) ABSTRACT

A microscope includes: a light source, an objective, a varifocal optical system that is arranged on an illumination light path between the objective and the light source, a reflection optical system that deflects an illumination light axis of the illumination light toward an optical axis of the objective, and a rotator that rotates the objective and the reflection optical system around a rotation axis that is orthogonal to the optical axis of the objective.

26 Claims, 22 Drawing Sheets

(51) Int. Cl.
  *G02B 21/02*   (2006.01)
  *G02B 21/06*   (2006.01)
  *G02B 21/16*   (2006.01)
  *G02B 21/24*   (2006.01)

(52) U.S. Cl.
  CPC ..... *G02B 21/0048* (2013.01); *G02B 21/0076* (2013.01); *G02B 21/025* (2013.01); *G02B 21/06* (2013.01); *G02B 21/16* (2013.01); *G02B 21/245* (2013.01)

(58) Field of Classification Search
  CPC ...... G02B 21/025; G02B 21/06; G02B 21/16; G02B 21/245
  See application file for complete search history.

(56) References Cited

U.S. PATENT DOCUMENTS

| | | | |
|---|---|---|---|
| 7,599,115 | B2 | 10/2009 | Gugel |
| 2005/0187441 | A1 | 8/2005 | Kawasaki et al. |
| 2007/0053059 | A1* | 3/2007 | Gugel ................ G02B 21/0024 359/386 |
| 2008/0239463 | A1 | 10/2008 | Hendriks et al. |
| 2010/0214639 | A1 | 8/2010 | Watson et al. |
| 2011/0127405 | A1* | 6/2011 | Grossman .......... G02B 21/0032 250/201.1 |
| 2015/0055078 | A1 | 2/2015 | Johnstone et al. |
| 2015/0338639 | A1 | 11/2015 | Matsumoto et al. |
| 2016/0299170 | A1* | 10/2016 | Ito ......................... G02B 26/10 |

FOREIGN PATENT DOCUMENTS

| | | |
|---|---|---|
| JP | 2004029685 A | 1/2004 |
| JP | 2004317704 A | 11/2004 |
| JP | 2005202338 A | 7/2005 |
| JP | 2006330321 A | 12/2006 |
| JP | 2007504498 A | 3/2007 |
| JP | 2009186604 A | 8/2009 |
| JP | 2010224320 A | 10/2010 |
| JP | 2011118264 A | 6/2011 |
| JP | 2012093387 A | 5/2012 |
| JP | 2012518794 A | 8/2012 |
| WO | 2007121863 A1 | 11/2007 |
| WO | 2010096786 A2 | 8/2010 |
| WO | 2013115383 A1 | 8/2013 |
| WO | 2015027152 A1 | 2/2015 |

OTHER PUBLICATIONS

Japanese Office Action (and English language translation thereof) dated Mar. 5, 2019 issued in counterpart Japanese Application 2015-205089.

* cited by examiner

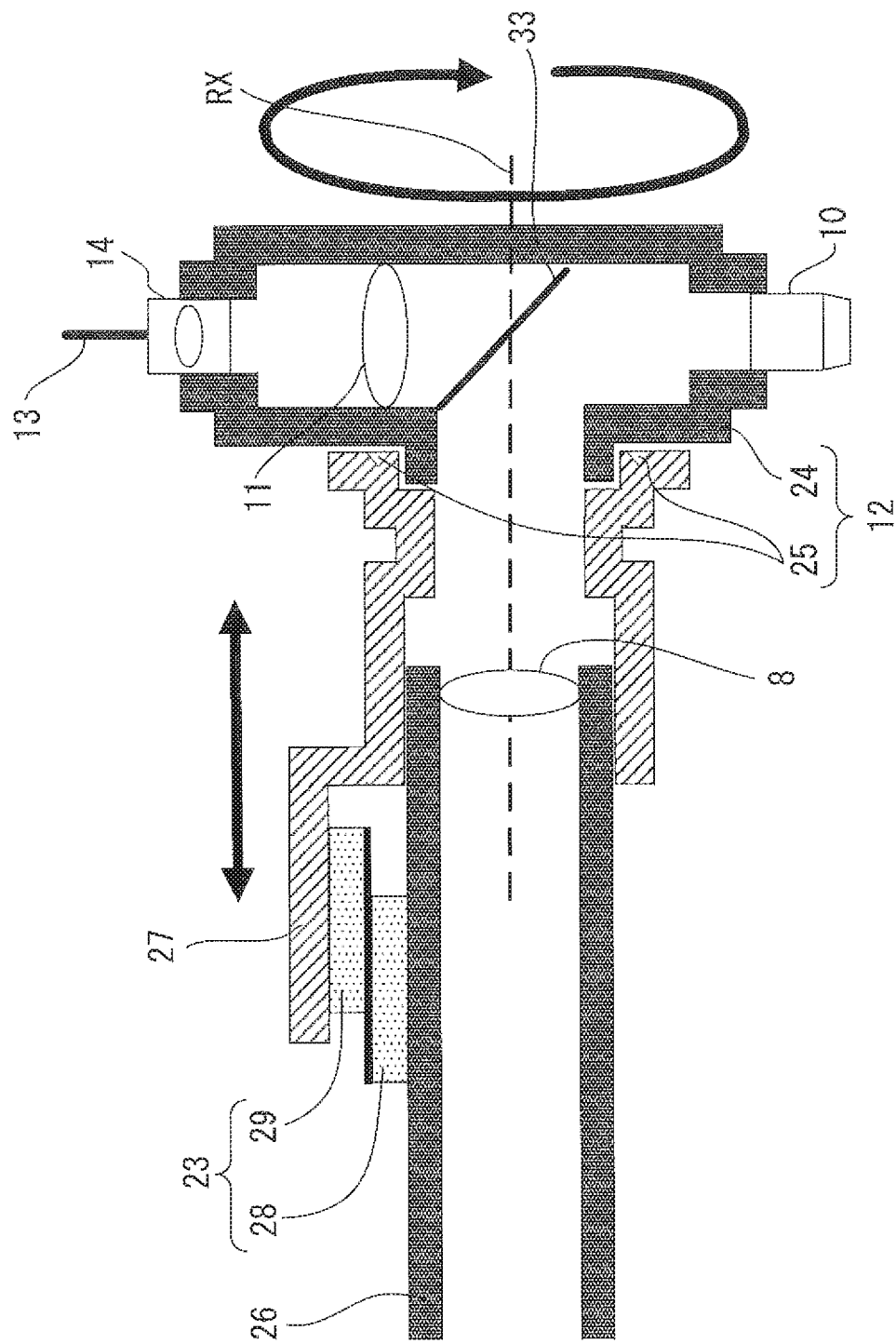
F I G. 5

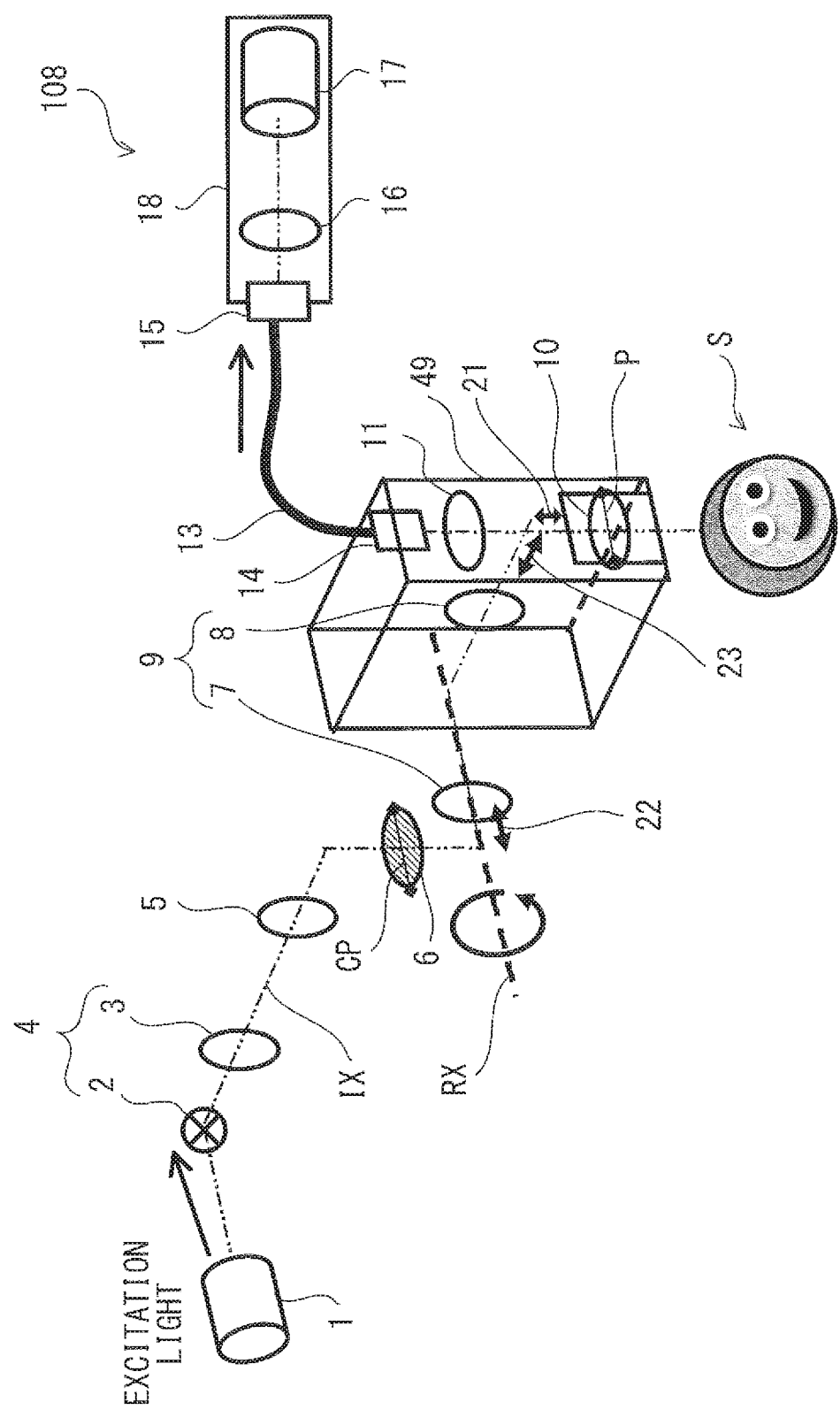
F I G. 16

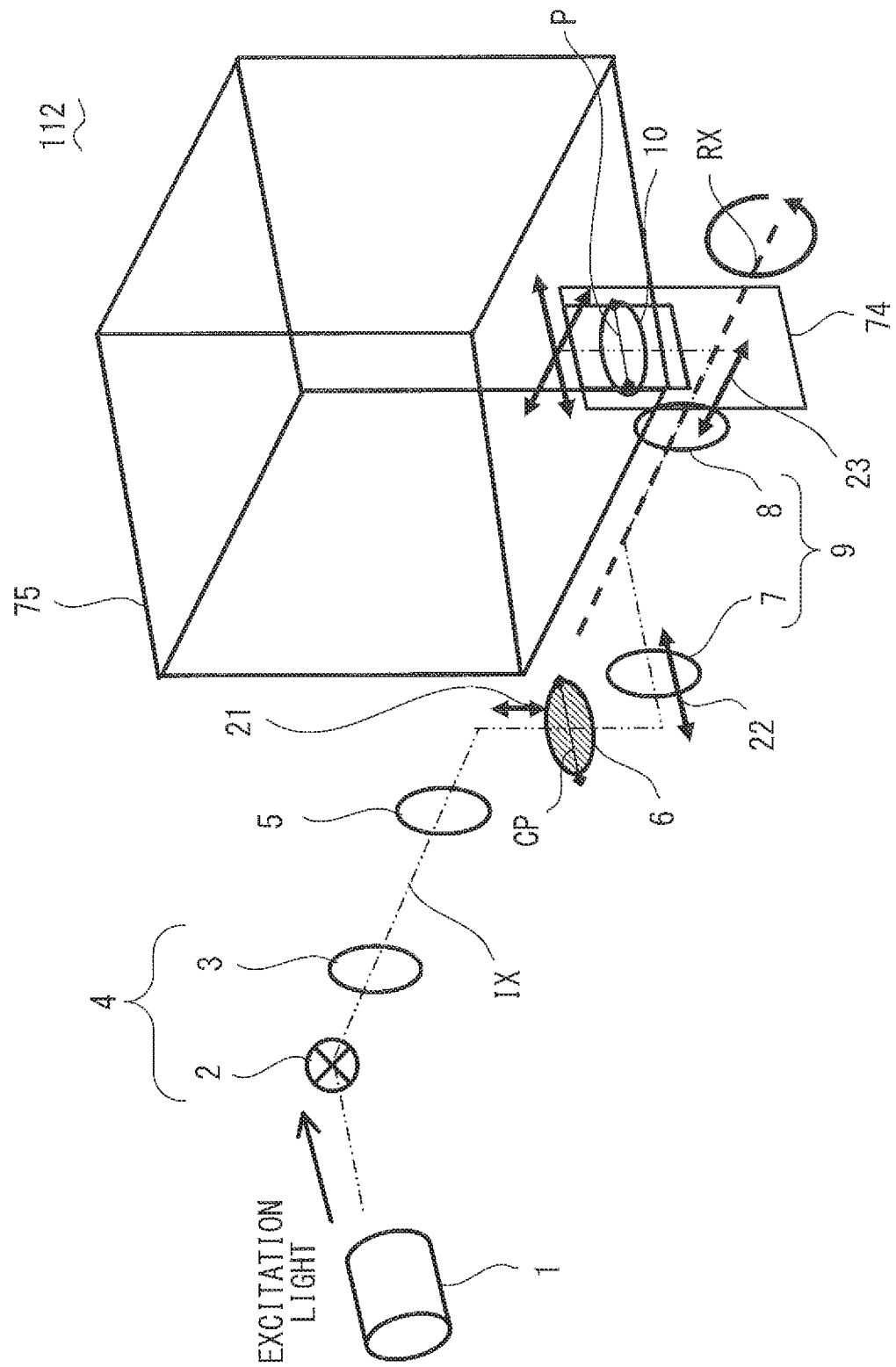
F I G. 2 0

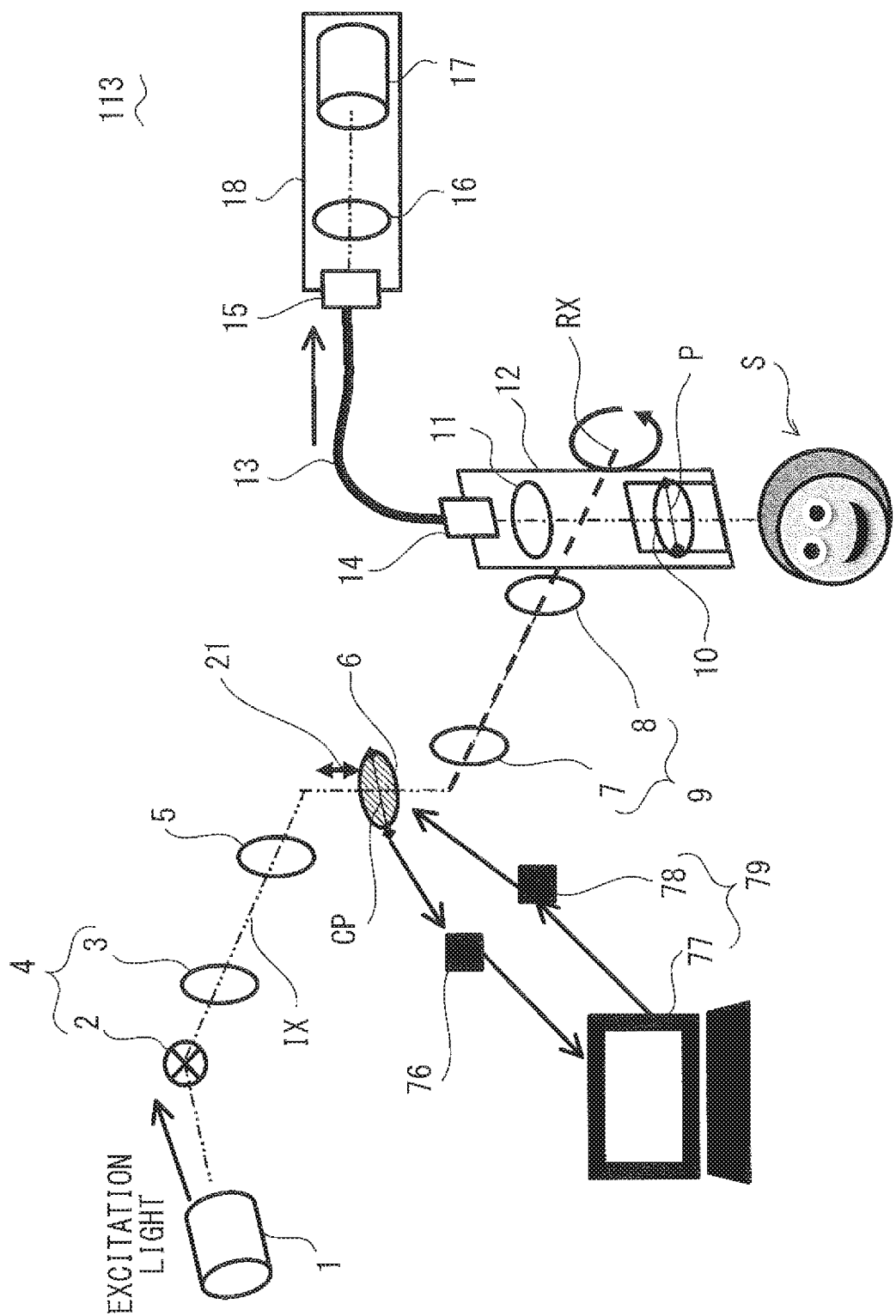
F I G. 21

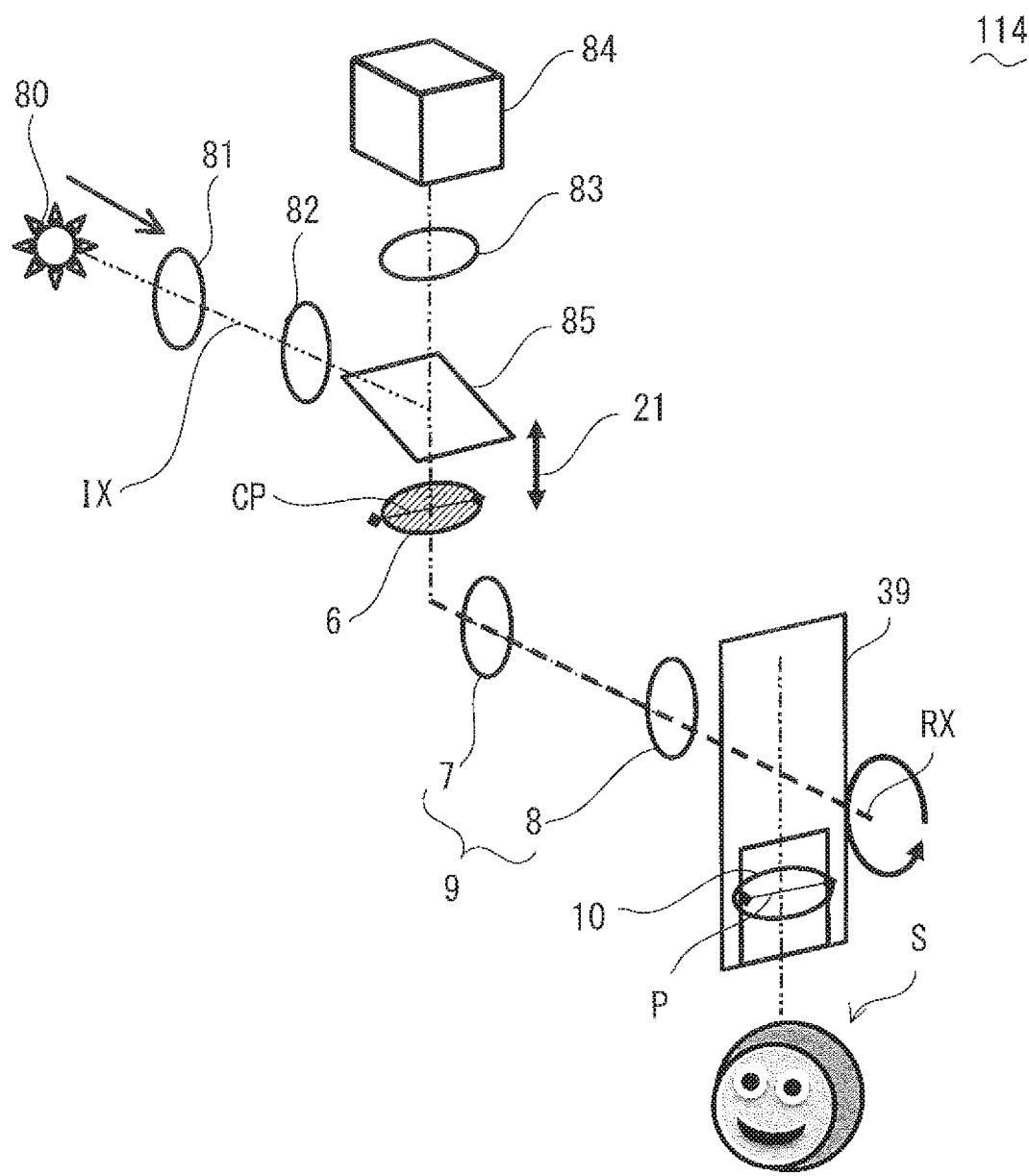
F I G. 22

MICROSCOPE

CROSS REFERENCE TO RELATED APPLICATIONS

This application is based upon and claims the benefit of priority from prior Japanese Patent Application No. 2015-205089, filed Oct. 16, 2015, the entire contents of which are incorporated herein by this reference.

BACKGROUND OF THE INVENTION

Field of the Invention

The present invention relates to a technology relating to a microscope.

Description of the Related Art

Laser scanning microscopes are a useful means for three-dimensionally observing the brains of animals. Conventionally, small animals such as mice are a main target for observation using the laser scanning microscopes. In recent years, the laser scanning microscopes have been used to observe the brains of larger animals such as primates.

When the brain of a primate is observed, observation is performed in a state in which the primate is erected on a stage. In this case, it is convenient that a field of view of a microscope cannot only move in xyz-axis directions that are orthogonal to each other, but that the orientation of an objective can also be changed such that a target can be observed from various directions. A microscope in which the orientation of an objective is variable is described, for example, in Japanese Laid-Open Patent Publication No. 2005-202338.

SUMMARY OF THE INVENTION

In one aspect of the present invention, a microscope is provided that includes: a light source that emits illumination light; an objective that the illumination light enters; a varifocal optical system that is arranged on an illumination light path between the objective and the light source; a reflection optical system that deflects an illumination light axis of the illumination light toward an optical axis of the objective, the reflection optical system being arranged on an illumination light path between the varifocal optical system and the objective; and a rotator that rotates the objective and the reflection optical system around a rotation axis that is orthogonal to the optical axis of the objective.

BRIEF DESCRIPTION OF THE DRAWINGS

The present invention will be more apparent from the following detailed description when the accompanying drawings are referenced.

FIG. 5 illustrates the configurations of a rotator 12 and an adjuster 23.

FIG. 16 illustrates the configuration of a microscope 108 in Example 9.

FIG. 20 illustrates the configuration of a microscope 112 in Example 13.

FIG. 21 illustrates the configuration of a microscope 113 in Example 14.

FIG. 22 illustrates the configuration of a microscope 114 in Example 15.

DESCRIPTION OF THE EMBODIMENTS

When movement of a field of view is realized by using a mechanical configuration, vibration may be caused by the movement of the field of view. In particular, when the field of view is moved in a direction of an optical axis of an objective (hereinafter, the direction of the optical axis of the objective is simply referred to as an optical axis direction) by moving the objective or a stage, vibration is likely to be generated. When vibration is generated while an image is being acquired, image quality is adversely affected. In addition, a sample may be affected by movement of the objective. Accordingly, there is a need for a technology for performing scanning in an optical axis direction without moving an objective or a stage.

Examples of the present invention are described below with reference to the drawings.

Example 1

Figure 1:
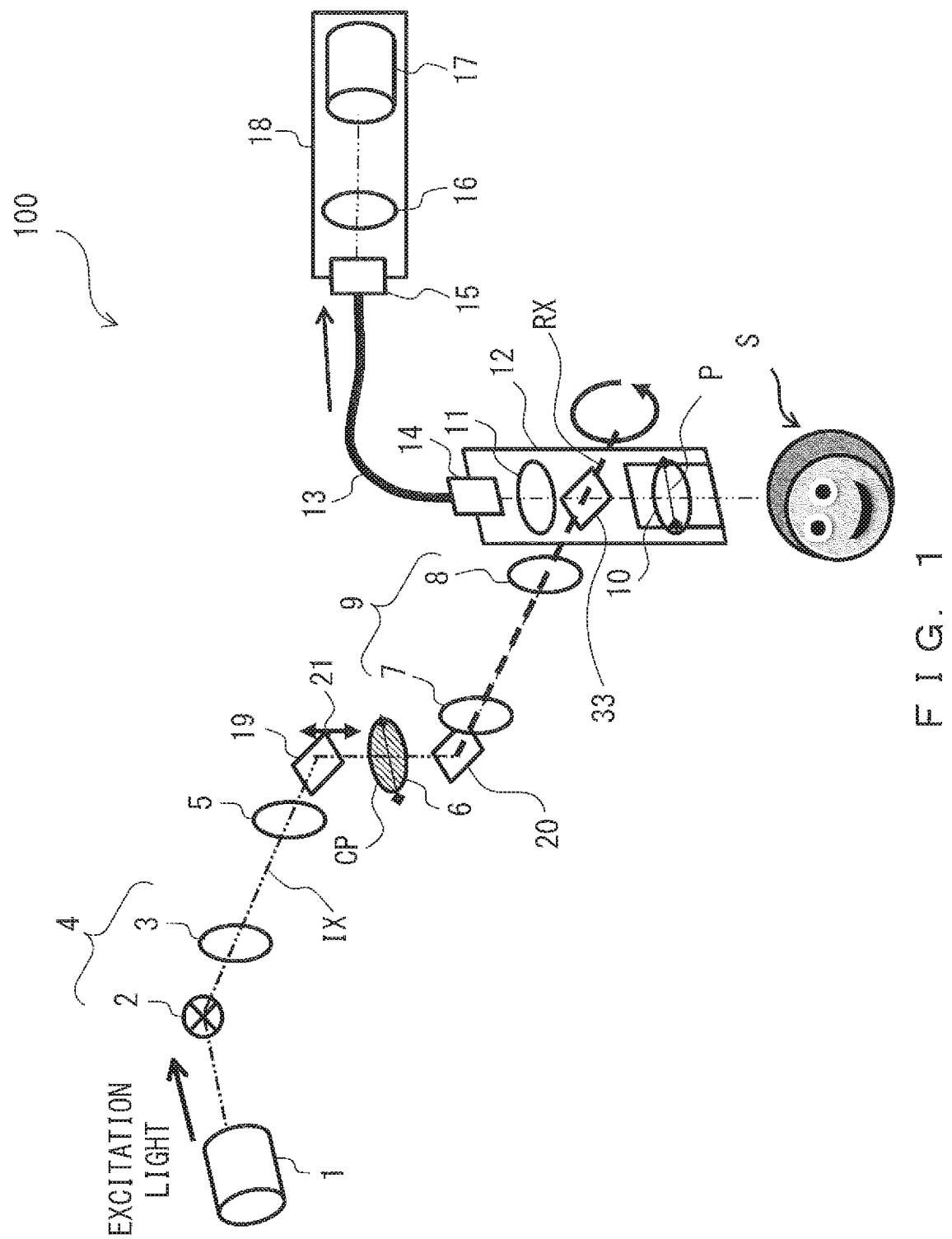
FIG. 1 illustrates the configuration of a microscope 100 in Example 1.
Figure 2:
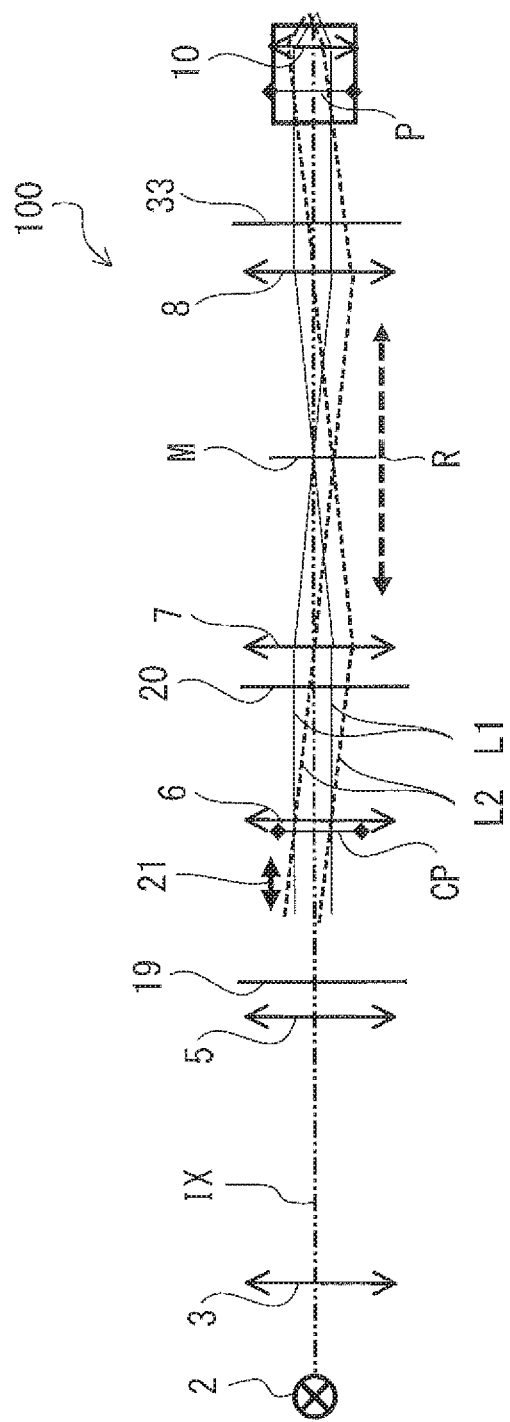
FIG. 2 is a diagram in which optical elements between a galvanometer mirror 2 and an objective 10 that are included in the microscope 100 are arranged on a straight line.

FIG. 1 illustrates the configuration of a microscope 100 in this example. FIG. 2 is a diagram in which optical elements between a galvanometer mirror 2 and an objective 10 that are included in the microscope 100 are arranged on a straight line. The microscope 100 is a laser scanning microscope that scans a sample S and acquires an image. The microscope 100 is, for example, a multi-photon excitation fluorescence microscope that irradiates the sample S with illumination light (excitation light) that is a laser beam, and that detects fluorescence from the sample S.

As illustrated in FIG. 1, the microscope 100 includes a light source 1 that emits illumination light, and the microscope 100 includes a scanning unit 4, a tube lens 5, a varifocal lens 6, a relay optical system 9, and an objective 10 on an optical path (an illumination light path) of the illumination light emitted from the light source 1.

The light source 1 is a laser unit that includes a laser that emits a laser beam. The light source 1 includes, for example, a pulse laser in an infrared wavelength region. The scanning unit 4 arranged between the light source 1 and the varifocal lens 6 scans the sample S in a direction orthogonal to an optical axis of the objective 10 by using the laser beam output from the light source 1. The scanning unit 4 includes the galvanometer mirror 2, and a pupil projection lens 3 that is arranged between the galvanometer mirror 2 and the tube lens 5 and that projects an exit pupil of the objective 10 onto the galvanometer mirror 2 or near the galvanometer mirror 2. The scanner included in the scanning unit 4 is not limited to the galvanometer mirror 2, and may be, for example, a resonance scanner. The tube lens 5 is arranged between the scanning unit 4 and the varifocal lens 6. The pupil projection lens 3 and the tube lens 5 configures a relay optical system that projects the galvanometer mirror 2 onto the varifocal lens 6 or near the varifocal lens 6.

The varifocal lens 6 is a varifocal optical system that is arranged on an illumination light path between the objective 10 and the light source 1 and that has a variable focal length. The varifocal lens 6 is an electrically tunable lens, and the varifocal lens 6 is typically a liquid lens (a fluid lens) in which the shape of a lens surface or an interface of liquid changes. It is preferable that the varifocal lens 6 be arranged in or near a position optically conjugate to the exit pupil of the objective 10 (hereinafter referred to as a pupil conjugate position CP), namely, in or near a position optically conjugate to the galvanometer mirror 2. Consequently, a change in magnification and generation of an aberration due to a change in the focal length of the varifocal lens 6 can be suppressed. Further, the varifocal lens 6 is arranged in such a way that an optical axis of the varifocal lens 6 faces a vertical direction when the microscope 100 is arranged on a horizontal plane. By doing this, deformation (in particular, deformation generated asymmetrically with an optical axis) of a lens shape due to gravity can be suppressed. Therefore, an aberration (in particular, a distortion aberration) caused by the deformation of the lens shape can be suppressed from being generated. Further, the focal length of the varifocal lens 6 changes, for example, within a range between a negative value and a positive value.

The relay optical system 9 is an optical system that projects the varifocal lens 6 in or near an exit pupil position P of the objective 10, and the relay optical system 9 has a positive power. The relay optical system 9 includes a lens 7 that is a first lens group and a lens 8 that is a second lens group, both having positive powers. Each of the lens 7 and the lens 8 may be configured of a plurality of lenses. The lens 8 is arranged so as to have a focal position on a side of the light source 1 (namely, a focal position closer to the light source 1 from among focal positions of the lens 8) in a focal position of the lens 7 on a side of the objective 10 (namely, a focal position closer to the objective 10 from among focal positions of the lens 7). The focal length of the lens 7 is equal to the focal length of the lens 8. Stated another way, the relay optical system 9 that is formed of the lens 7 and the lens 8 is a 4f optical system, and the relay optical system 9 is configured so as to project the varifocal lens 6 in or near the exit pupil position P with no magnification (at a magnification of 1). Consequently, magnification can be maintained even when a focal position changes. It is preferable that the focal lengths of the lens 7 and the lens 8 be not excessively short. When the focal lengths are excessively short, lengths between these lenses and an intermediate image M described later becomes short, and an intermediate image M is further formed between the lens 7 and the lens 8. An amount of variation in a position of the intermediate image is proportional to the square of the magnification of the intermediate image M. Accordingly, when a focus deviates, a laser beam may be condensed onto the lens 7 or the lens 8, and a lens onto which the laser beam is condensed may be damaged, or scratches generated in the lens or dusts adhering to the lens may be imaged in an image. When the magnification of the relay optical system is unmagnification, a configuration from the objective 10 to the varifocal lens 6 can be easily applied to an existing microscope.

The objective 10 is an infinity-corrected objective that illumination light used to irradiate the sample S enters. The objective 10 may be a dry objective or an immersion type objective.

The microscope 100 further includes, on the illumination light path, a plurality of reflection optical systems (a mirror 19, a mirror 20, and a dichroic mirror 33) that change a direction of an illumination light axis IX, as illustrated in FIGS. 1 and 2. None of the plurality of reflection optical systems has power.

The mirror 19 is arranged on an optical path between the tube lens 5 and the varifocal lens 6, and the mirror 19 changes a direction of the illumination light axis IX in such a way that an incident light axis and an emitted light axis of the mirror 19 are orthogonal to each other. More specifically, the mirror 19 is arranged in such a way that the emitted light axis of the mirror 19 faces a vertical direction. The mirror 20 is arranged on an optical path between the varifocal lens 6 and the lens 7, and the mirror 20 changes the direction of the illumination light axis IX in such a way that an incident light axis and an emitted light axis of the mirror 20 are orthogonal to each other. Stated another way, the mirror 20 is arranged in such a way that the emitted light axis of the mirror 20 faces a direction orthogonal to the vertical direction. The dichroic mirror 33 has a wavelength reflectance characteristic whereby a laser beam emitted from the light source 1 is reflected and fluorescence from the sample S is transmitted. The dichroic mirror 33 is arranged on an illumination light path between the varifocal lens 6 and the objective 10 (more specifically, between the lens 8 and the objective 10), and the dichroic mirror 33 changes the direction of the illumination light axis IX in such a way that the illumination light axis IX faces an optical axis of the objective 10.

In this specification, the illumination light axis refers to a central axis of a flux of illumination light. An illumination light axis at the time when the flux of illumination light enters an optical system is referred to as an incident light axis of the optical system, and an illumination light axis at the time when the flux of illumination light is emitted from an optical system is referred to as an emitted light axis of the optical system. When illumination light is deflected by a scanner, the illumination light axis refers to a central axis of a flux of illumination light that is condensed onto the optical axis of the objective 10 such as a light flux L1 illustrated in FIG. 2. The light flux L1 and a light flux L2 illustrated in FIG. 2 are respectively fluxes of illumination light deflected in different directions by the galvanometer mirror 2. The light flux L1 is a flux of light that is condensed onto the optical axis of the objective 10. The light flux L2 is a flux of light that is condensed in a position deviating from the optical axis of the objective 10. When a condensing position on a sample plane is changed by the varifocal lens 6, a spherical aberration is generated. When the spherical aberration is generated, an image is darkened, and therefore it is preferable that a light flux be narrowed to some extent in order to reduce an influence of the spherical aberration. It is preferable that the diameter of the light flux L1 in the exit pupil position P be designed to be smaller than or equal to 70% of a pupil diameter, and, in particular, to be about 50% of the pupil diameter. Note that the diameter of a light flux is a diameter whereby an intensity becomes $1/e^2$ of an intensity on an axis.

The microscope 100 includes an adjuster 21 that adjusts a length between the mirror 19 and the varifocal lens 6, as illustrated in FIG. 2. The adjuster 21 is, for example, a linear guide used to move, in the vertical direction, a housing body, such as a lens barrel and/or a frame, that houses the varifocal lens 6 and optical elements that follow (optical elements from the varifocal lens 6 to the objective 10) on the illumination light path. The adjuster 21 may be configured so as to be manually moved in the vertical direction by a user, or may be configured so as to electrically move in accordance with an instruction from a user. The adjuster 21 is principally used to largely move a field of view in order to search for a portion to be observed.

The microscope 100 includes the objective 10, the dichroic mirror 33, an incident-end condenser lens 11, an optical fiber 13, and a non-descanned detection unit 18 on a detection light path of fluorescence from the sample S that has been irradiated with a laser beam, as illustrated in FIGS. 1 and 2. An incident end 14 of the optical fiber 13 is fixed to the rotator 12 that houses the objective 10, the dichroic mirror 33, and the incident-end condenser lens 11, and an emitting end 15 of the optical fiber 13 is fixed to the non-descanned detection unit 18 that includes an emitting-end condenser lens 16 and a photodetector 17. The photodetector 17 is a non-descanned detector that detects fluorescence from the sample S, and the photodetector 17 is, for example, a photomultiplier tube (PMT). A configuration in which the rotator 12 and the non-descanned detection unit 18 are connected to each other by using the optical fiber 13 is particularly preferable in that the rotator 12 can be reduced in weight. By separating the rotator 12 from the non-descanned detection unit 18 by using the optical fiber 13, a space above the sample S increases, and therefore a degree of freedom in the arrangement or operation of the sample S can increase.

The microscope 100 further includes the rotator 12, as illustrated in FIG. 1. The rotator 12 is a rotator that rotates the objective 10, the dichroic mirror 33, and the incident-end condenser lens 11 around a rotation axis RX. The rotation axis RX is a rotation axis that is orthogonal to the optical axis of the objective 10, and the rotation axis RX matches the emitted light axis of the mirror 20, namely, an optical axis of the relay optical system 9. The rotator 12 includes a lens barrel that houses the objective 10, the dichroic mirror 33, and the incident-end condenser lens 11. By the lens barrel rotating around the rotation axis RX, the objective 10, the dichroic mirror 33, and the incident-end condenser lens 11 that are housed in the lens barrel also rotate around the rotation axis RX such that the orientation of the objective 10 changes.

In the microscope 100, a laser beam emitted from the light source 1 enters the galvanometer mirror 2 in the state of a parallel light flux. The laser beam reflected by the galvanometer mirror 2 enters the mirror 19 in the state of the parallel light flux after a beam diameter is adjusted by the pupil projection lens 3 and the tube lens 5. The parallel light flux refers to a light flux for which the diameter of a light flux does not change, such as a light flux in which a principal ray and a marginal ray are parallel to each other.

The laser beam reflected by the mirror 19 enters the varifocal lens 6 that has an optical axis facing the vertical direction, and the state of a light flux is adjusted according to a focal length of the varifocal lens 6. The laser beam that passes through the varifocal lens 6 and that is an almost parallel light flux is reflected by the mirror 20, and the lens 7 forms an intermediate image M between the lens 7 and the lens 8. A position in which the intermediate image M is formed changes according to the focal length of the varifocal lens 6. A variation range R illustrated in FIG. 2 indicates a range in which the intermediate image M can be formed. Then, the laser beam is converted again to an almost parallel light flux by the lens 8, enters the objective 10 via the dichroic mirror 33, and is applied to the sample S.

Fluorescence from the sample S that has been irradiated with the laser beam is received by the objective 10, is transmitted through the dichroic mirror 33, and enters the incident-end condenser lens 11. The dichroic mirror 33 that is arranged between the objective 10 and the varifocal lens 6 is a fluorescence splitter that splits the laser beam reflected by the sample S from the fluorescence from the sample S. The split fluorescence is detected by the non-descanned detection unit 18. More specifically, the fluorescence that has been condensed onto the incident end 14 of the optical fiber 13 by the incident-end condenser lens 11 is output from the emitting end 15 via the optical fiber 13, and enters the non-descanned detection unit 18. The fluorescence that has entered the non-descanned detection unit 18 is guided to the photodetector 17 by the emitting-end condenser lens 16. The photodetector 17 outputs a signal according to an amount of the detected fluorescence.

The microscope 100 two-dimensionally scans the sample S by using the galvanometer mirror 2 so as to generate two-dimensional image data of the sample S on the basis of the signal from the photodetector 17. Further, the microscope 100 changes the focal length of the varifocal lens 6 that is arranged between the objective 10 and the light source 1, and scans the sample S in the optical axis direction so as to generate plural pieces of two-dimensional image data for different depths. By doing this, three-dimensional information of the sample S can be obtained from the plural pieces of two-dimensional image data, and therefore the sample S can be observed three-dimensionally.

In the microscope 100, the dichroic mirror 33, together with the objective 10, is rotated around the rotation axis RX by the rotator 12. Therefore, even when the orientation of the objective 10 changes, illumination light can be directed toward the optical axis of the objective 10 by using the dichroic mirror 33. Accordingly, by using the microscope 100, the sample S can be easily observed from various directions by changing the orientation of the objective 10.

In the microscope 100, scanning of the sample S in the optical axis direction is realized by the varifocal lens 6. The varifocal lens 6 can change a focal length at a high speed. Accordingly, by using the microscope 100, scanning in the optical axis direction can be realized without mechanically moving structures near the sample S, such as the objective 10 and/or the stage, by changing the focal length of the varifocal lens 6. Consequently, generation of vibration caused by scanning in the optical axis direction can be greatly suppressed. Further, a speed of scanning in the optical axis direction can increase. Furthermore, scanning by using the varifocal lens 6 is always performed in the optical axis direction of the objective 10 regardless of the orientation of the objective 10, unlike scanning by using the objective 10 or the stage. Accordingly, by using the microscope 100 including the varifocal lens 6, a secure scanning in the optical axis direction can be acquired in addition to an effect for suppressing vibration.

Example 2

Figure 3:
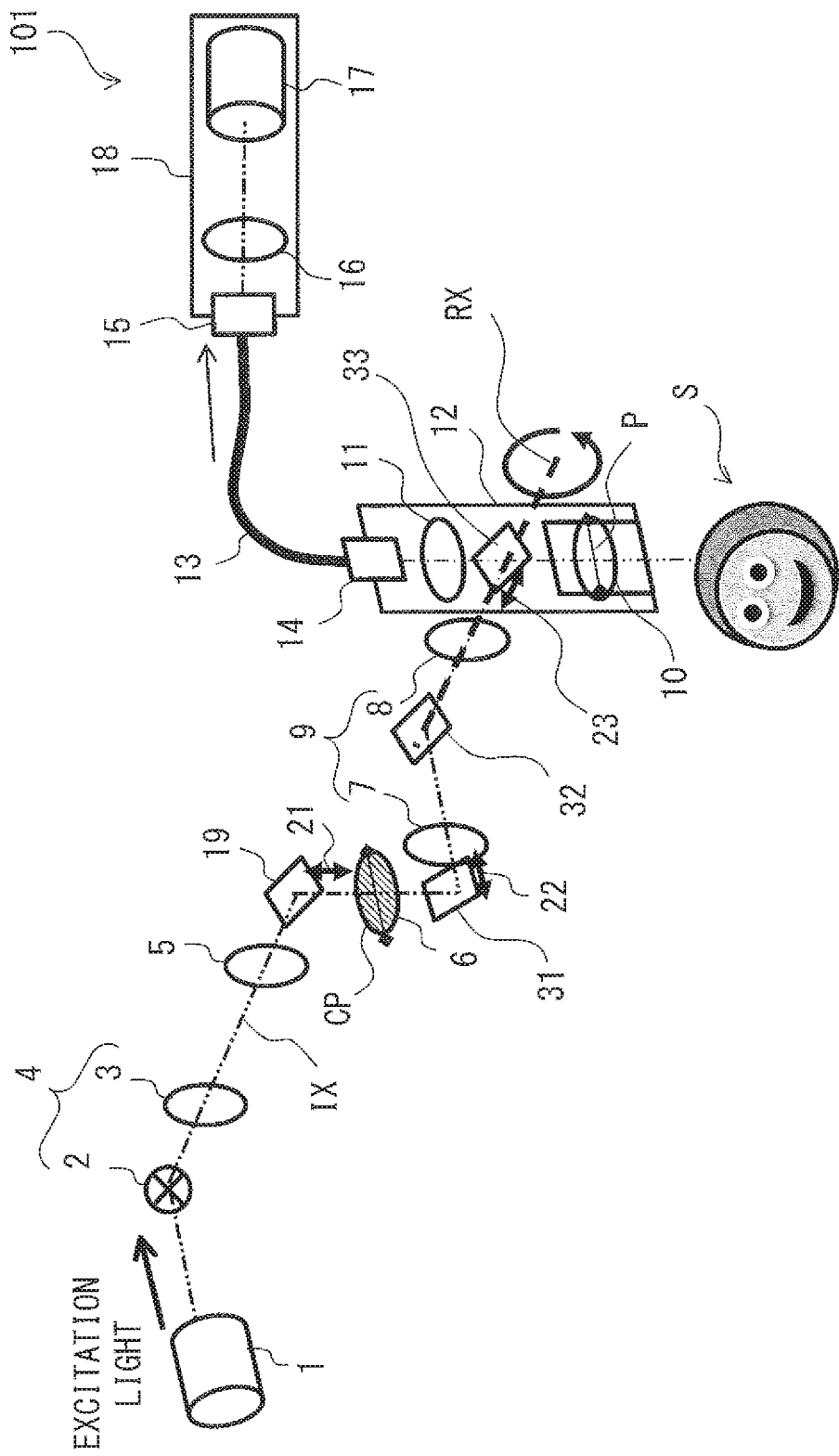
FIG. 3 illustrates the configuration of a microscope 101 in Example 2.
Figure 4:
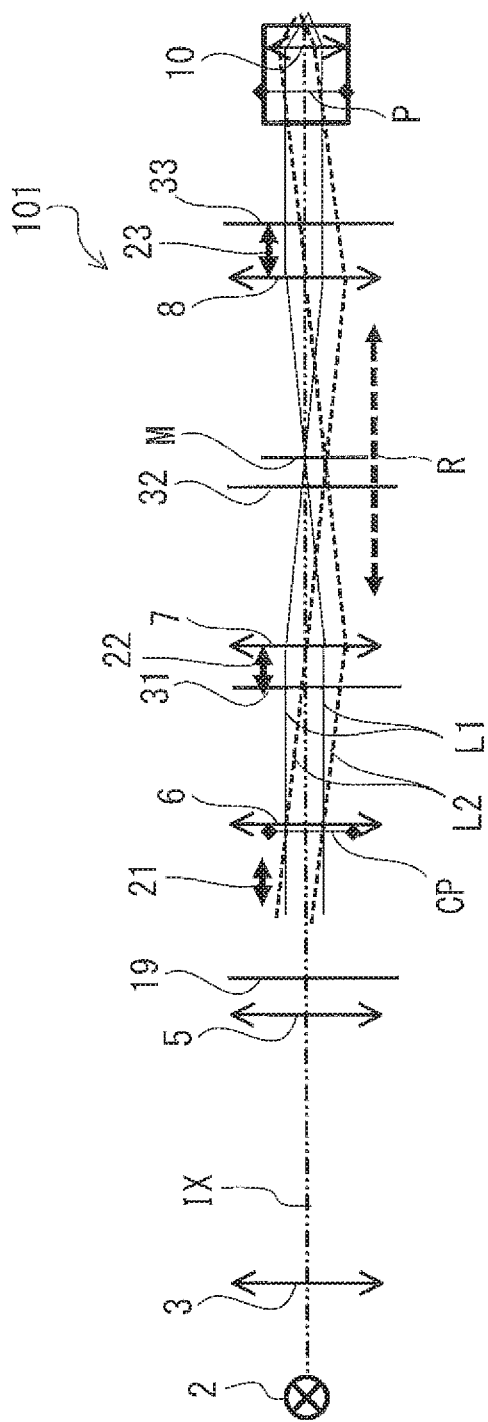
FIG. 4 is a diagram in which optical elements between a galvanometer mirror 2 and an objective 10 that are included in the microscope 101 are arranged on a straight line.

FIG. 3 illustrates the configuration of a microscope 101 in this example. FIG. 4 is a diagram in which optical elements between a galvanometer mirror 2 and an objective 10 that are included in the microscope 101 are arranged on a straight line. The microscope 101 is a laser scanning microscope, similarly to the microscope 100, and the microscope 101 is, for example, a multi-photon excitation fluorescence microscope. The microscope 101 is different from the microscope 100 in the configuration of an optical system between a varifocal lens 6 and an objective 10. In the other respects, the microscope 101 is similar to the microscope 100.

The microscope 101 includes three reflection optical systems (a mirror 31, a mirror 32, and a dichroic mirror 33) on an illumination light path between the varifocal lens 6 and the objective 10, as illustrated in FIGS. 3 and 4. The mirror 31 that is a first reflection optical system, the mirror 32 that is a second reflection optical system, and the dichroic mirror 33 that is a third reflection optical system and a fluorescence splitter are arranged in order of proximity to the varifocal lens 6. Each of the mirror 31 and the mirror 32 changes the direction of an illumination light axis IX in such a way that an incident light axis is orthogonal to an emitted light axis. In addition, the mirror 31 and the mirror 32 are arranged in such a way that a first plane (a yz plane) that includes an incident light axis and an emitted light axis of the mirror 31 is orthogonal to a second plane (an xy plane) that includes an incident light axis and an emitted light axis of the mirror 32. A mirror 19 is arranged in such a way that a plane (an xz plane) that includes an incident light axis and an emitted light axis of the mirror 19 is orthogonal to both the first plane and the second plane.

The microscope 101 further includes an adjuster 22 that is a first adjuster that adjusts a length between the mirror 31 and the mirror 32, and an adjuster 23 that is a second adjuster that adjusts a length between the mirror 32 and the dichroic mirror 33, as illustrated in FIG. 4. The adjuster 22 is configured so as to adjust a length between the mirror 31 and the lens 7 that an almost parallel light flux passes through in a state in which the varifocal lens 6 has no power. The adjuster 23 is configured so as to adjust a length between the lens 8 and the dichroic mirror 33 that an almost parallel light flux similarly passes through. By arranging the adjuster 22 and the adjuster 23 in a position through which an almost parallel light flux passes, an influence of variation of a length between lenses on an image relay can be suppressed. When the varifocal lens 6 has power in order to scan an image in the optical axis direction, a convergent or divergent light flux passes through the adjuster 22 and the adjuster 23. Accordingly, changing of a length by the adjuster 22 and the adjuster 23 has an influence on an image relay, but the configuration above enables the influence to be minimized.

FIG. 5 illustrates the configurations of a rotator 12 and an adjuster 23. The rotator 12 includes a lens barrel 24 that rotates, for example, around a rotation axis RX orthogonal to the optical axis of the objective 10, as illustrated in FIG. 5. The rotation axis RX matches the emitted light axis of the mirror 32. The lens barrel 24 houses the objective 10, the dichroic mirror 33, and an incident-end condenser lens 11. Further, an incident end 14 of an optical fiber 13 is fixed to the lens barrel 24. The lens barrel 24 is rotatably fitted to a movable frame 27 that slides in a direction parallel to the rotation axis RX. In the rotator 12, a rotation guide 25 that is formed in the lens barrel 24 is guided by an annular groove formed in the movable frame 27 such that a stable rotation of the lens barrel 24 is realized.

The adjuster 23 is, for example, a linear guide that is formed of a rail 28 and a slider 29, as illustrated in FIG. 5. The adjuster 23 is provided between a fixed frame 26 and the movable frame 27. The fixed frame 26 is a frame that houses the lens 8. The rail 28 is mounted onto an external surface of the fixed frame 26 in a direction parallel to the rotation axis RX (a direction of an optical axis of the lens 8). The movable frame 27 is a frame that rotatably supports the lens barrel 24. The slider 29 is mounted onto an internal surface of the movable frame 27 in a direction parallel to the rotation axis RX. The movable frame 27 slides integrally with the lens barrel 24 in a direction parallel to the rotation axis RX by the slider 29 sliding on the rail 28. Consequently, a length between the lens 8 and the dichroic mirror 33 is adjusted. Exemplary configurations of the adjuster 21 and the adjuster 22 are not illustrated, but the adjuster 21 and the adjuster 22 have configurations similar to the configuration of the adjuster 23. The adjuster 21 and the adjuster 22 may be, for example, linear guides.

The microscope 101 can produce an effect similar to the effect of the microscope 100. In addition, the microscope 101 includes the adjuster 22 and the adjuster 23 in addition to the adjuster 21, and therefore a field of view can be largely moved three-dimensionally. Accordingly, as an example, even when a large object to be observed, such as primates, is observed, a portion to be observed can be easily located in a state in which the object to be observed is fixed.

Example 3

Figure 6:
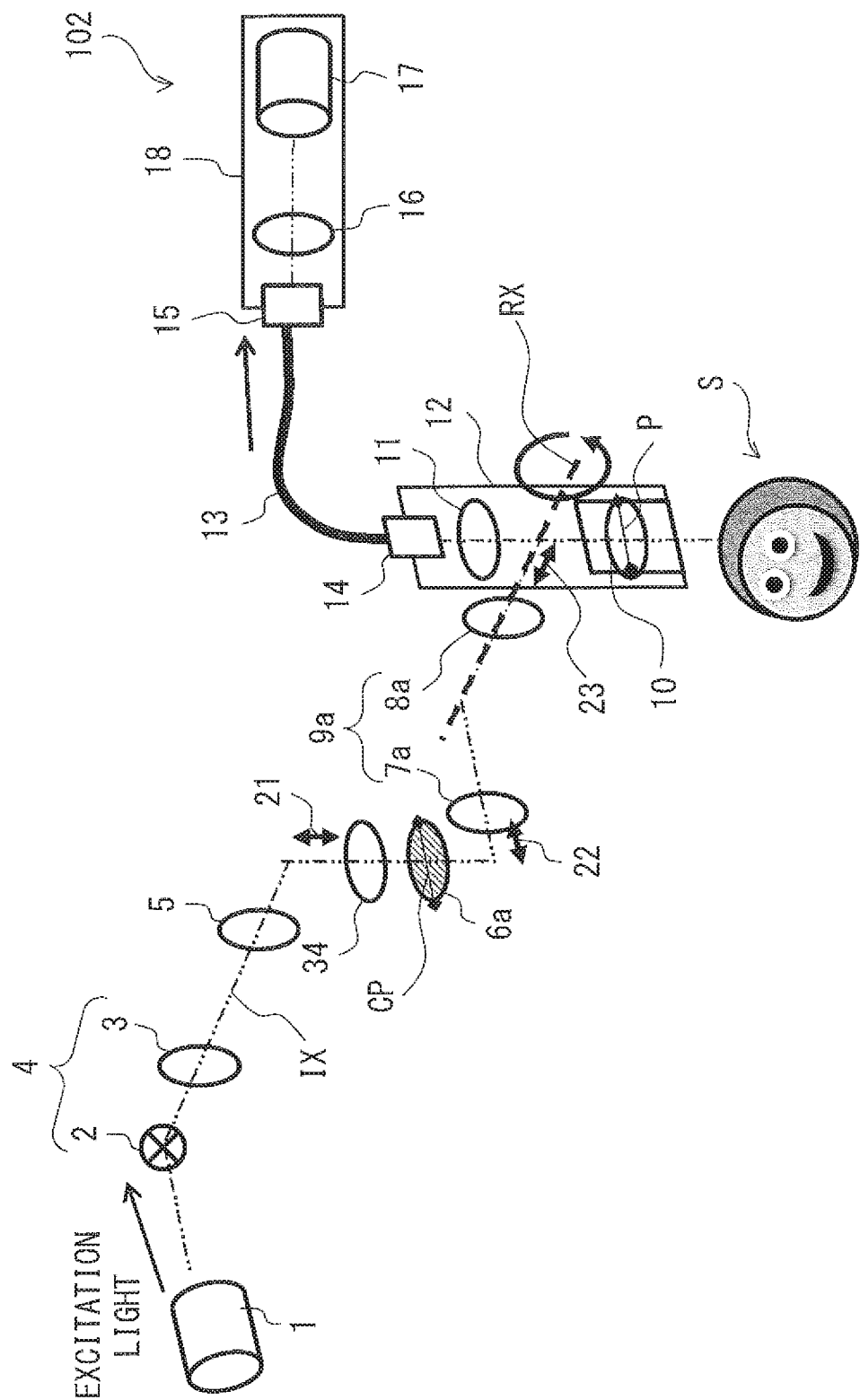
FIG. 6 illustrates the configuration of a microscope 102 in Example 3.
Figure 7:
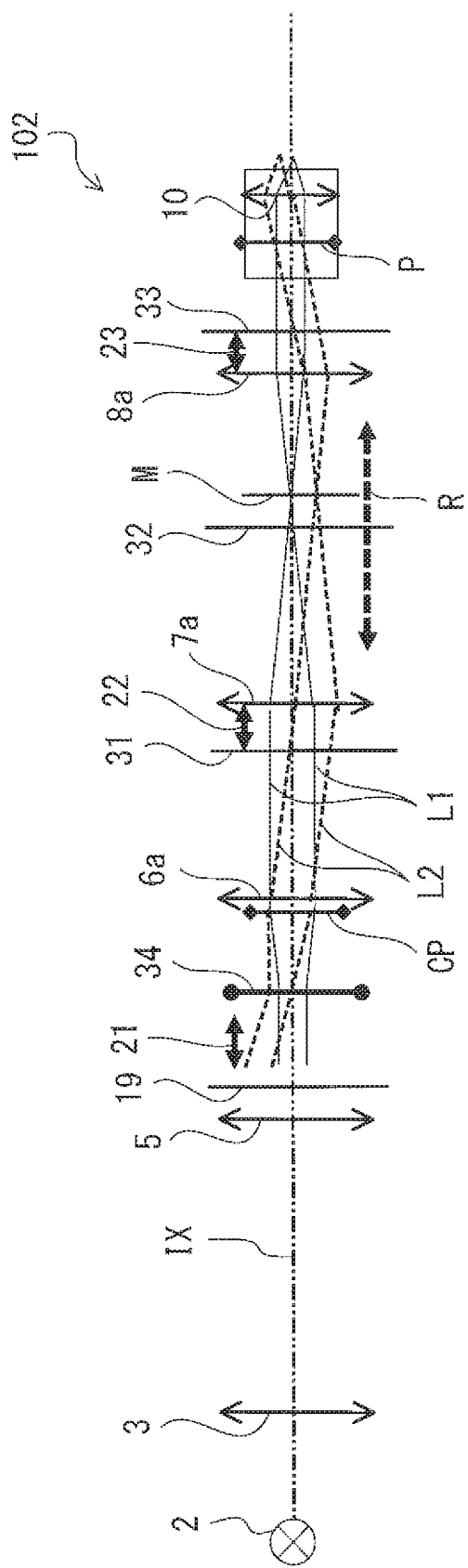
FIG. 7 is a diagram in which optical elements between a galvanometer mirror 2 and an objective 10 that are included in the microscope 102 are arranged on a straight line.
Figure 8:
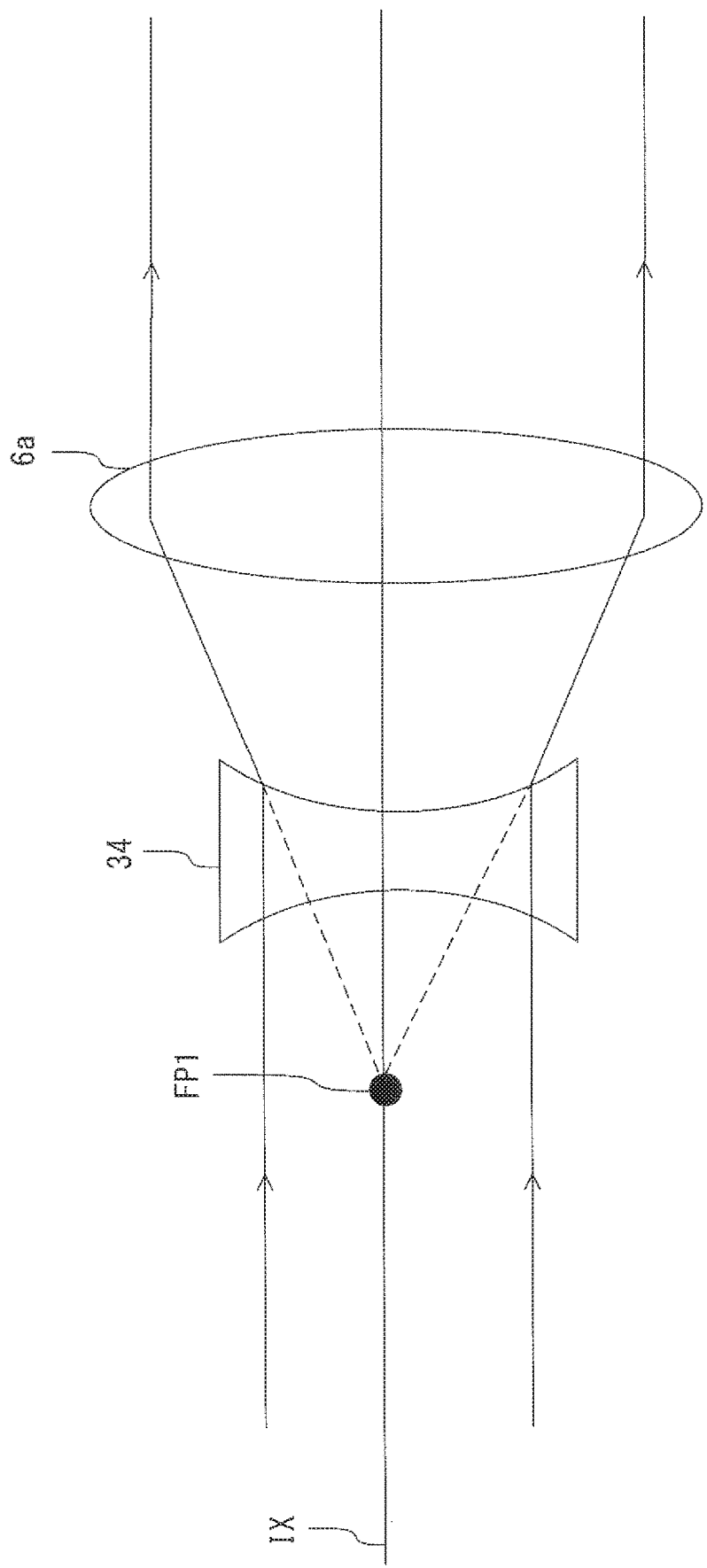
FIG. 8 is a diagram explaining a position relationship between an offset lens 34 and a varifocal lens 6a that are included in the microscope 102.

FIG. 6 illustrates the configuration of a microscope 102 in this example. FIG. 7 is a diagram in which optical elements between a galvanometer mirror 2 and an objective 10 that are included in the microscope 102 are arranged on a straight line. FIG. 8 is a diagram explaining a position relationship between an offset lens 34 and a varifocal lens 6a that are included in the microscope 102. The microscope 102 is a laser scanning microscope, similarly to the microscope 100 and the microscope 101, and the microscope 102 is, for example, a multi-photon excitation fluorescence microscope. The microscope 102 is different from the microscope 101 in that the microscope 102 includes the varifocal lens 6a and the offset lens 34 instead of the varifocal lens 6 and that the microscope 102 includes a relay optical system 9a instead of the relay optical system 9. In the other respects, the microscope 102 is similar to the microscope 101.

The varifocal lens 6a is different from the varifocal lens 6 in that a focal length changes within a positive value range, and does not have a negative value. When a varifocal lens for which a focal length changes within a range of either a positive value or a negative value is used instead of the varifocal lens 6, an undesirable situation is generated in which a state of a light flux that enters an exit pupil position P of the objective 10 while the varifocal lens is scanning in an optical axis direction is either a convergent state or a divergent state. Accordingly, in the microscope 102, the offset lens 34 is arranged near the varifocal lens 6a in order to prevent the state of the light flux that enters the exit pupil position P from being either the convergent state or the divergent state.

The offset lens 34 is a forward offset lens group having a negative power. The offset lens 34 is arranged between the galvanometer mirror 2 and the varifocal lens 6a in such a way that a composite focal length of the offset lens 34 and the varifocal lens 6a changes within a range from a negative value to a positive value as the focal length of the varifocal lens 6a changes. Specifically, as illustrated in FIG. 8, the offset lens 34 is arranged in such away that, when the varifocal lens 6a has a prescribed focal length, a focal position of the varifocal lens 6a on a side of the galvanometer mirror 2 matches a focal position FP1 of the offset lens 34 on the side of the galvanometer mirror 2. Consequently, when the varifocal lens 6a has a prescribed focal length, the offset lens 34 and the varifocal lens 6a can convert a parallel light flux incident on the offset lens 34 into a parallel light flux having a different diameter of a light flux. In addition, the offset lens 34 and the varifocal lens 6a can convert a parallel light flux incident on the offset lens 34 into a convergent light flux by making the varifocal lens 6a have a focal length shorter than a prescribed focal length. The offset lens 34 and the varifocal lens 6a can also convert the parallel light flux incident on the offset lens 34 into a divergent light flux by making the varifocal lens 6 have a focal length longer than the prescribed focal length. It is preferable that the prescribed focal length be around the center of a range (a variation range) in which the focal length of the varifocal lens 6a changes. By setting the prescribed focal length to be around the center of the variation range, variable ranges of a focal position on a sample plane in a positive direction (a direction in which a focal position is located farther from an objective) and a negative direction (a direction in which a condensing position is located closer to the objective) can be made uniform.

The relay optical system 9a is an optical system that projects the varifocal lens 6a in or near the exit pupil position P of the objective 10, and the relay optical system 9a has a positive power. The relay optical system 9a includes a lens 7a that is a first lens group and a lens 8a that is a second lens group, and both the lens 7a and the lens 8a have positive powers. Each of the lens 7a and the lens 8a may be configured of a plurality of lenses. The lens 8a is arranged so as to have a focal position on a side of a light source 1 in a focal position of the lens 7a on a side of the objective 10. Stated another way, the relay optical system 9a is a both-side telecentric optical system. A magnification at which the varifocal lens is projected in or near the exit pupil position P is different between the relay optical system 9a and the relay optical system 9.

The microscope 102 is configured so as to satisfy conditional expression (1) below. In this conditional expression, f1 is a focal length of the lens 7a. f2 is a focal length of the lens 8a. fo is a focal length of the offset lens 34. fv is a focal length of the varifocal lens 6a when a focal position of the offset lens 34 on a side of a scanning unit 4 matches a focal position of the varifocal lens 6a on the side of the scanning unit 4.

$$-fv/fo \times f2/f1 = 1 \qquad (1)$$

By satisfying conditional expression (1), the microscope 102 can maintain a magnification at which the exit pupil position P is projected onto the galvanometer mirror 2 to be the same as that of the microscope 101.

The microscope 102 can produce an effect similar to that of the microscope 101, even when a varifocal lens is used for which a focal length changes within a positive value range and does not have a negative value.

Example 4

Figure 9:
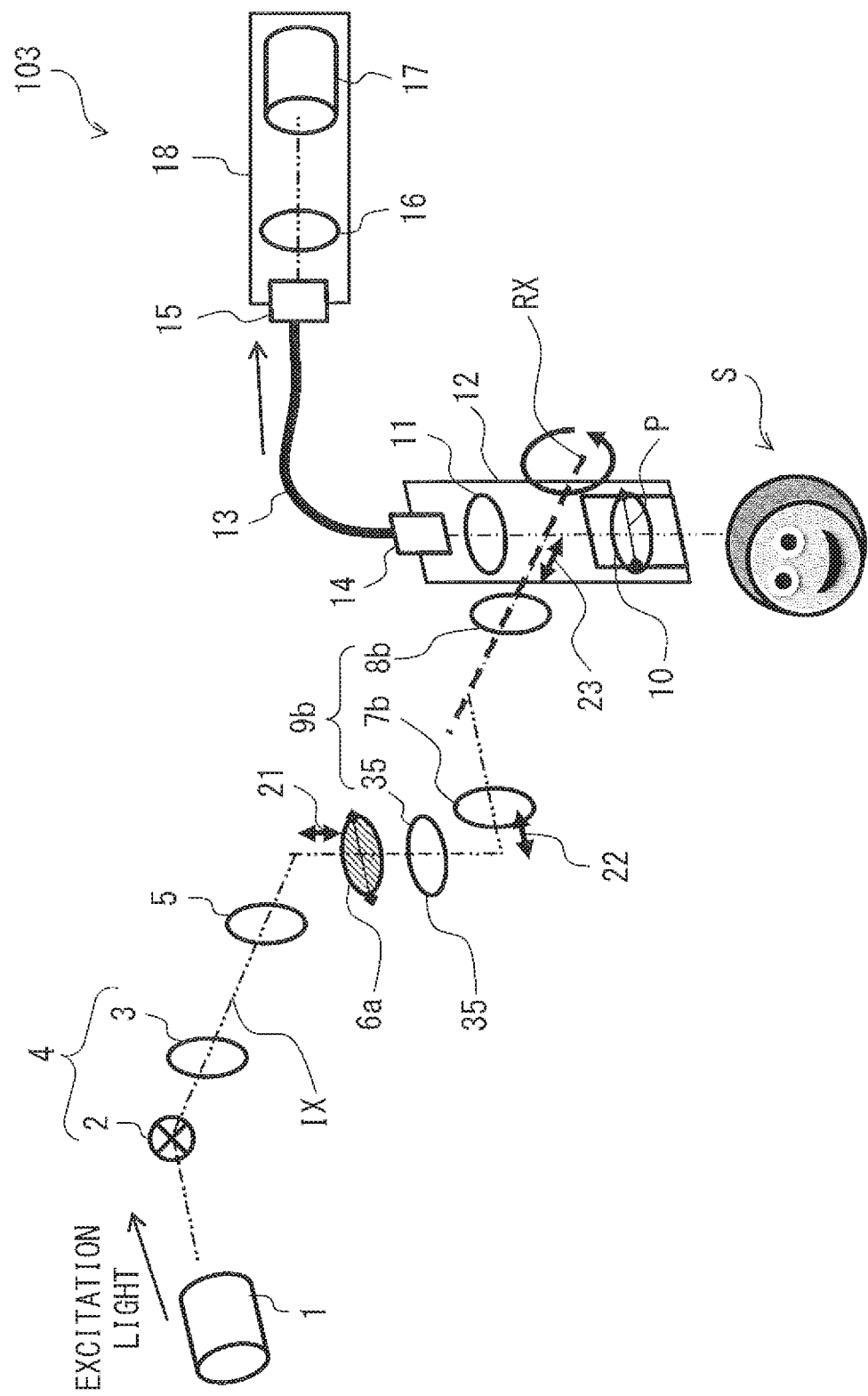
FIG. 9 illustrates the configuration of a microscope 103 in Example 4.
Figure 10:
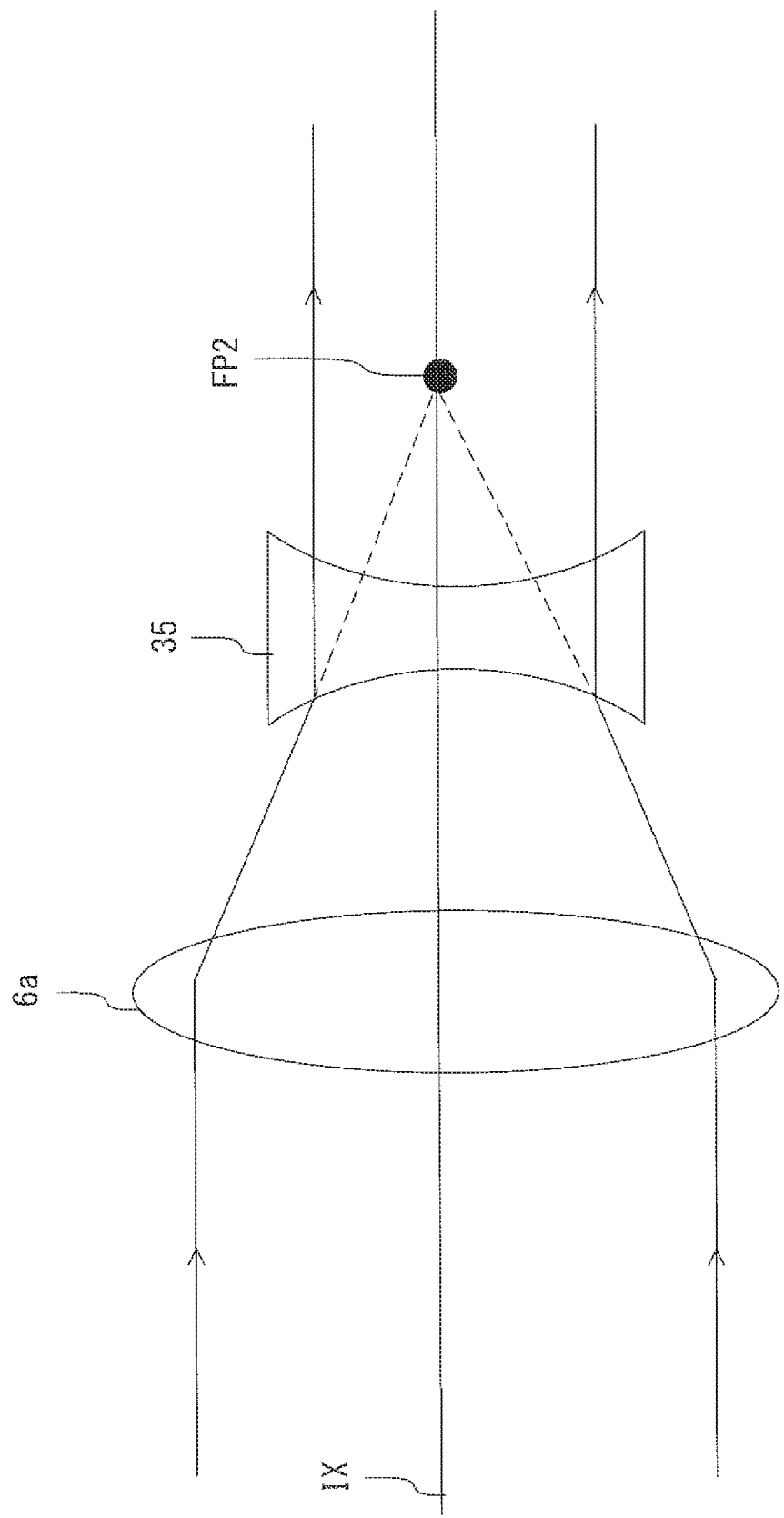
FIG. 10 is a diagram explaining a position relationship between an offset lens 35 and a varifocal lens 6a that are included in the microscope 103.

FIG. 9 illustrates the configuration of a microscope 103 in this example. FIG. 10 is a diagram explaining a position relationship between an offset lens 35 and a varifocal lens 6a that are included in the microscope 103. The microscope 103 is a laser scanning microscope, similarly to the microscope 100 to the microscope 102, and the microscope 103 is, for example, a multi-photon excitation fluorescence microscope. The microscope 103 is different from the microscope 102 in that the microscope 103 includes the offset lens 35 instead of the offset lens 34 and that the microscope 103 includes a relay optical system 9b instead of the relay optical system 9a. In the other respects, the microscope 103 is similar to the microscope 102.

The offset lens 35 is a backward offset lens group having a negative power. The offset lens 35 is arranged between the varifocal lens 6a and an objective 10 in such a way that a composite focal length of the varifocal lens 6a and the offset lens 35 changes within a range from a negative value to a positive value as a focal length of the varifocal lens 6a changes. Specifically, the offset lens 35 is arranged in such a way that, when the varifocal lens 6a has a prescribed focal length, a focal position of the varifocal lens 6a on a side of the objective 10 matches a focal position FP2 of the offset lens 35 on the side of the objective 10, as illustrated in FIG. 10.

The relay optical system 9b is an optical system that projects the varifocal lens 6a in or near an exit pupil position P of the objective 10, and the relay optical system 9b has a positive power. The relay optical system 9b includes the offset lens 35 having a negative power, a lens 7b that is a first lens group having a positive power, and a lens 8b that is a second lens group having a positive power. Each of the offset lens 35, the lens 7b, and the lens 8b may be configured of a plurality of lenses. The lens 8b is arranged so as to have a focal position on a side of a light source 1 in a focal position of the lens 7b on a side of the objective 10. Stated another way, an optical system that is configured of the lens 7b and the lens 8b is a both-side telecentric optical system. A magnification at which the varifocal lens is projected in or near the exit pupil position P is different between the relay optical system 9b and the relay optical system 9.

The microscope 103 is configured so as to satisfy conditional expression (2) below. In this conditional expression, f1 is a focal length of the lens 7b. f2 is a focal length of the lens 8b. fo is a focal length of the offset lens 35. fv is a focal length of the varifocal lens 6a when a focal position of the offset lens 35 on a side of the objective 10 matches a focal position of the varifocal lens 6a on the side of the objective 10.

$$-fo/fv \times f2/f1 = 1 \qquad (2)$$

By satisfying conditional expression (2), the microscope 103 can maintain a magnification at which the exit pupil position P is projected onto a galvanometer mirror 2 to be the same as the magnification of the microscope 101.

The microscope 103 can produce an effect similar to that of the microscope 101, even when a varifocal lens is used for which a focal length changes within a positive value range and does not have a negative value.

Example 5

Figure 11:
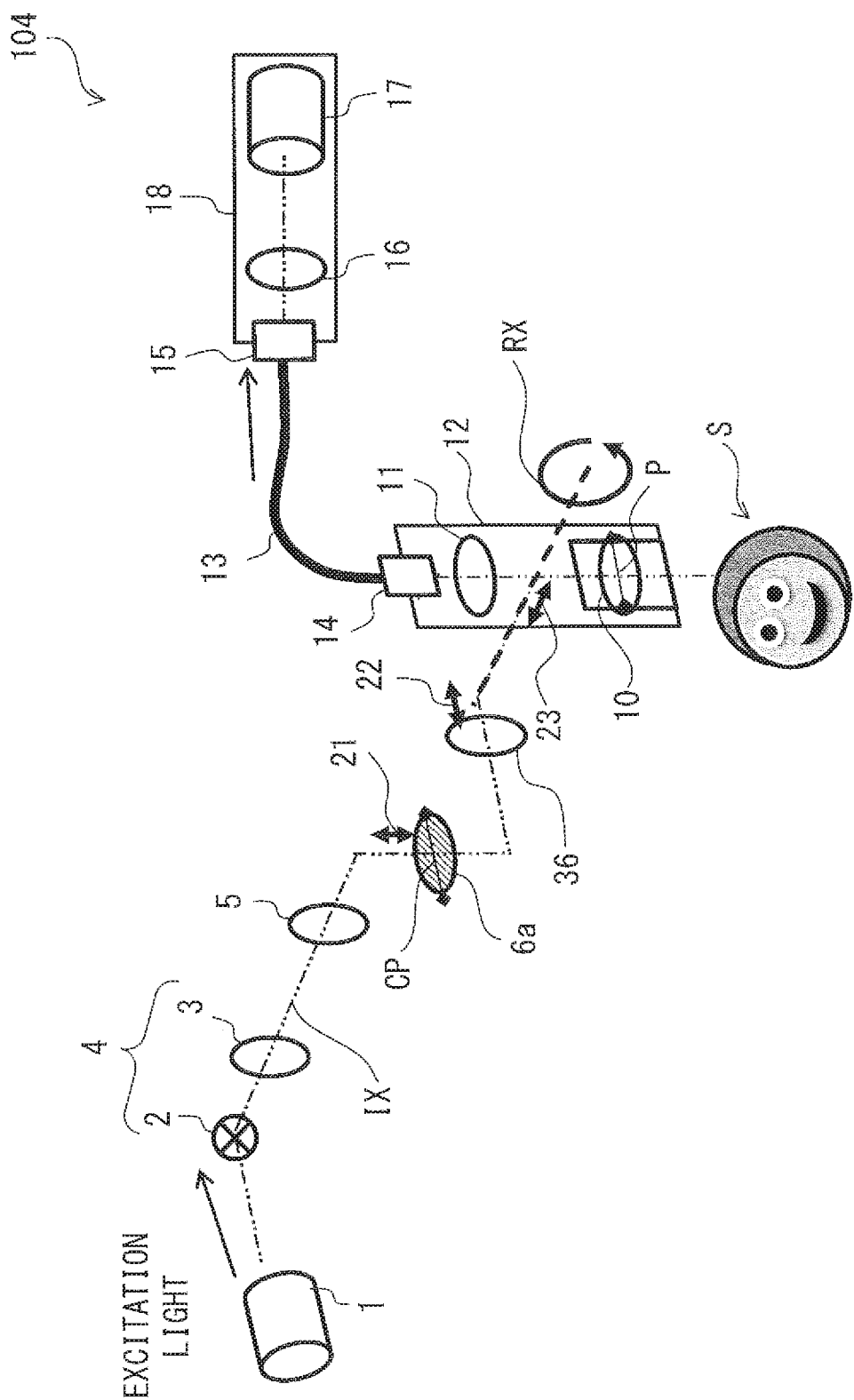
FIG. 11 illustrates the configuration of a microscope 104 in Example 5.
Figure 12:
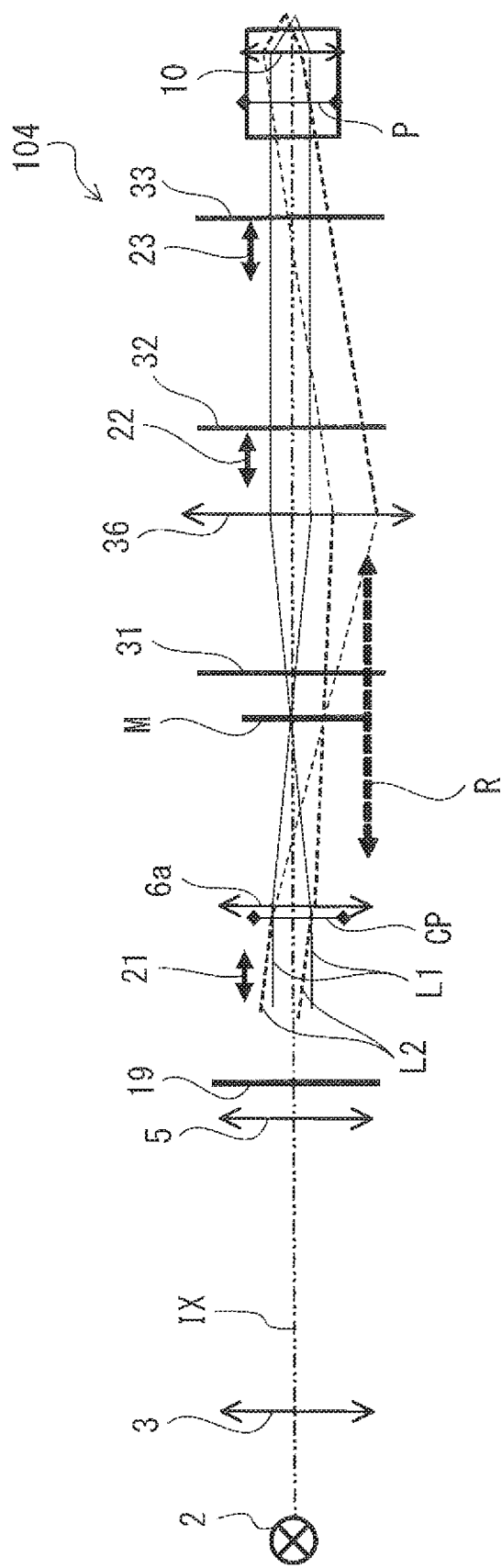
FIG. 12 is a diagram in which optical elements between a galvanometer mirror 2 and an objective 10 that are included in the microscope 104 are arranged on a straight line.

FIG. 11 illustrates the configuration of a microscope 104 in this example. FIG. 12 is a diagram in which optical elements between a galvanometer mirror 2 and an objective 10 that are included in the microscope 104 are arranged on a straight line. The microscope 104 is a laser scanning microscope, similarly to the microscope 100 to the microscope 103, and the microscope 104 is, for example, a multi-photon excitation fluorescence microscope. The microscope 104 is different from the microscope 101 in that the microscope 104 includes a varifocal lens 6a instead of the varifocal lens 6 and that the microscope 104 includes a relay lens 36 instead of the relay optical system 9. In the other respects, the microscope 104 is similar to the microscope 101.

The varifocal lens 6a is a varifocal lens having a focal length that changes within a positive value range, and the varifocal lens 6a is the varifocal lens described in Example 3 and Example 4. The relay lens 36 is a relay optical system having a positive power that projects the varifocal lens 6a in or near an exit pupil position P of the objective 10. It is preferable that the relay lens 36 be configured so as to project the varifocal lens 6a in the pupil exit position P with no magnification. Stated another way, it is preferable that the relay lens 36 be arranged in a position away from the varifocal lens 6a and the objective 10 by twice the focal length of the relay lens 36 (2f). The relay lens 36 may be configured of a plurality of lenses. The varifocal lens 6a and the relay lens 36 are configured so as to convert a parallel light flux incident on the varifocal lens 6a into an almost parallel light flux when the varifocal lens 6a has a prescribed focal length, in particular, when the varifocal lens 6a has the same focal length as that of the relay lens 36. It is preferable that the varifocal lens 6a and the relay lens 36 be configured in such a way that incident light is converted into a parallel light flux when the varifocal lens 6a has a focal length around the center of a variation range. Consequently, a light flux incident in the exit pupil position P can be suppressed from excessively converging or diverging.

An adjuster 22 is configured to adjust a length between the relay lens 36 and a mirror 32 that an almost parallel light flux passes through. An adjuster 23 is configured to adjust a length between the mirror 32 and a dichroic mirror 33 that the almost parallel light flux similarly passes through. The adjuster 22 and the adjuster 23 are, for example, linear sliders.

The microscope 104 can produce an effect similar to the effect of the microscope 101, even when a varifocal lens is used for which a focal length changes within a positive value range and does not have a negative value. In addition, by using the microscope 104, a length between the relay lens 36 and the objective 10 can increase, and the adjuster 22 and the adjuster 23 can be arranged close to the objective 10, compared with Examples 2 to 4.

Example 6

Figure 13:
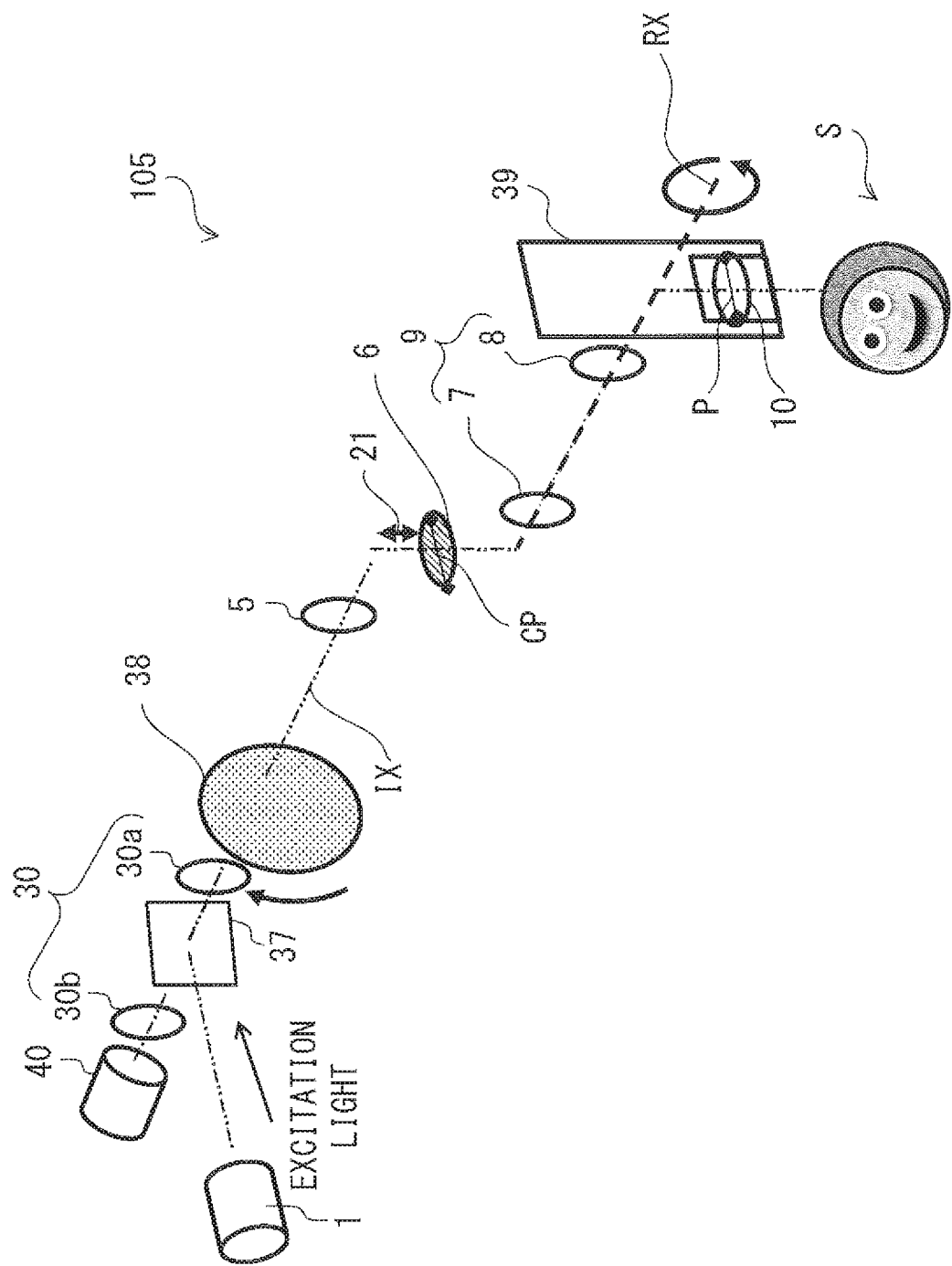
FIG. 13 illustrates the configuration of a microscope 105 in Example 6.

FIG. 13 illustrates the configuration of a microscope 105 in this example. The microscope 105 is a laser scanning microscope, and the microscope 105 is, for example, a disk scanning confocal microscope. The microscope 105 is different from the microscope 100 in that the microscope 105 includes a rotary disk 38 instead of the scanning unit 4 and that the microscope 105 includes a relay optical system 30 (a relay lens 30a and a relay lens 30b), a dichroic mirror 37, and a photodetector 40 instead of the incident-end condenser lens 11, the optical fiber 13, and the non-descanned detection unit 18.

The microscope 105 further includes a rotator 39 instead of the rotator 12. The rotator 39 is different from the rotator 12 in that the incident-end condenser lens 11 is not housed and that a mirror (not illustrated) is housed instead of the dichroic mirror 33, but, similarly to the rotator 12, the rotator 39 rotates around a rotation axis RX that is orthogonal to an optical axis of an objective 10.

The dichroic mirror 37 has a wavelength reflectance characteristic whereby a laser beam emitted from a light source 1 is reflected, and fluorescence from a sample S is transmitted. The rotary disk 38 is a scanning unit that is arranged between the light source 1 and a varifocal lens 6, and that scans the sample S in a direction orthogonal to the optical axis of the objective 10 by using the laser beam, and the rotary disk 38 is arranged on a focal plane of a tube lens 5 on a side of the light source 1. Slit-shaped or pinhole-shaped apertures are formed in the rotary disk 38. The photodetector 40 is a two-dimensional image sensor. The relay optical system 30 projects the rotary disk 38 onto the photodetector 40. The photodetector 40 may be, for example, a CCD (Charge-Coupled Device) image sensor or a CMOS (Complementary MOS) image sensor. In the microscope 105, fluorescence generated from positions that are optically conjugate to the apertures formed in the rotary disk 38 passes through the rotary disk 38, the relay optical system 30, and the dichroic mirror 37, and the fluorescence is detected by the photodetector 40. Accordingly, the sample S is scanned by the rotary disk 38 rotating around a rotation axis that is almost orthogonal to an optical axis of the tube lens 5.

The microscope 105 can produce an effect similar to the effect of the microscope 100. The microscope 105 is formed by transforming the microscope 100 into a disk scanning confocal microscope, but any one of the microscope 101 to the microscope 104 may be transformed into a disk scanning confocal microscope. Stated another way, a disk scanning confocal microscope may include three reflection optical systems between a varifocal lens and an objective 10, or may include an offset lens having a negative power in addition to the varifocal lens.

Example 7

Figure 14:
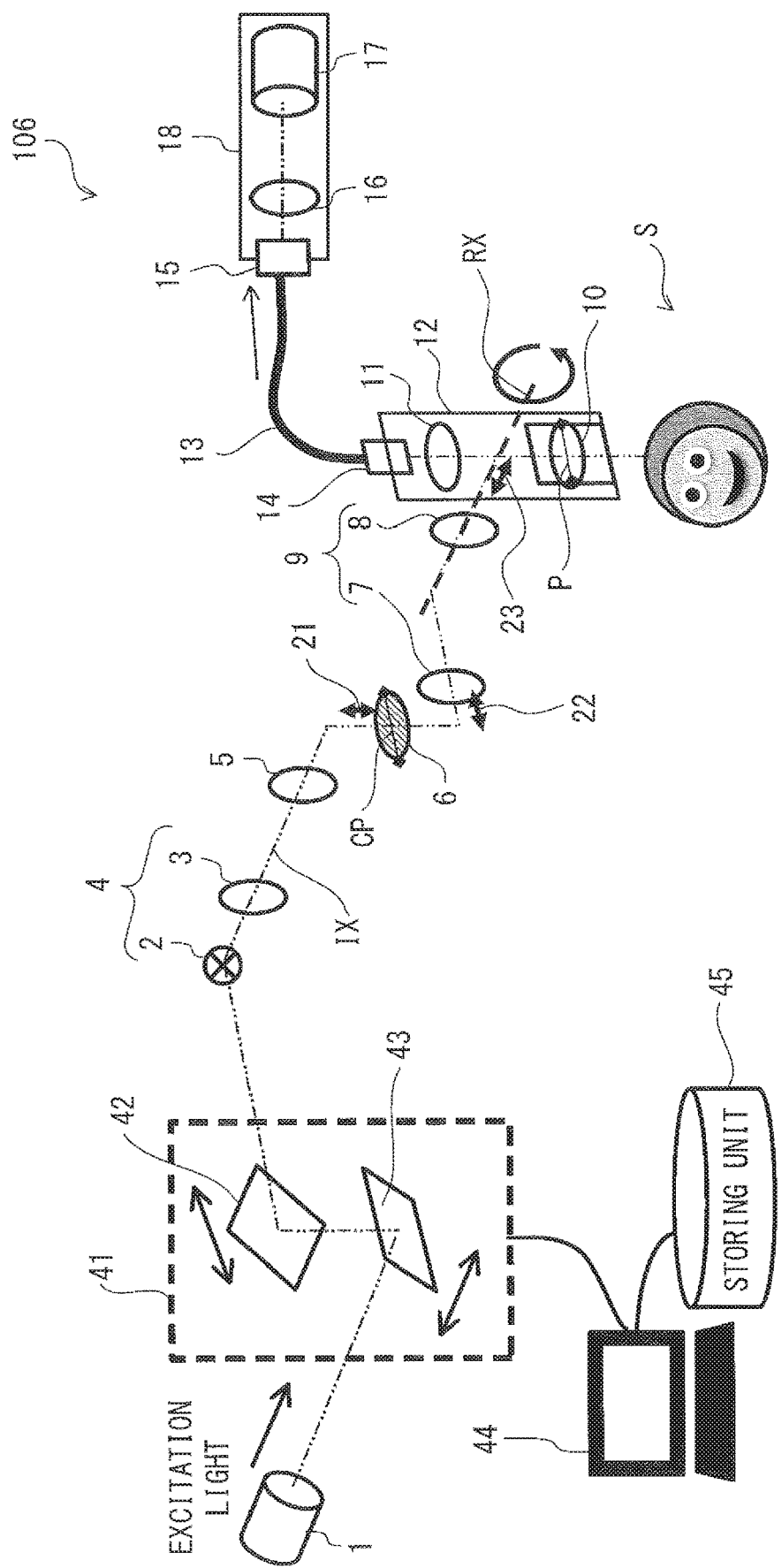
FIG. 14 illustrates the configuration of a microscope 106 in Example 7.

FIG. 14 illustrates the configuration of a microscope 106 in this example. The microscope 106 is a laser scanning microscope, and is, for example, a multi-photon excitation fluorescence microscope. The microscope 106 is different from the microscope 101 in that the microscope 106 includes a beam shifting unit 41 that shifts a laser beam, a controller 44 that is a shift control unit that controls the beam shifting unit 41, and a storing unit 45. In the other respects, the microscope 106 is similar to the microscope 101.

The beam shifting unit 41 is arranged between a light source 1 and a scanning unit 4. The beam shifting unit 41 includes a mirror 42 and a mirror 43. Each of the mirror 42 and the mirror 43 is arranged so as to move in a direction parallel to an incident light axis or an emitted light axis.

The controller 44 controls the beam shifting unit 41 (the mirror 42 and the mirror 43) in such a way that a laser beam enters the center of an exit pupil of an objective 10. Namely, the controller 44 changes the positions of the mirror 42 and the mirror 43. More specifically, the controller 44 controls the beam shifting unit 41 according to setting information of the beam shifting unit 41 that has been stored in the storing unit 45 in such a way that a laser beam enters the center of the exit pupil of the objective 10. The storing unit 45 stores position information of the mirror 42 and the mirror 43 at the time when a laser beam enters the center of the exit pupil of the objective 10, for example, for each combination of a wavelength of the laser beam, a focal length of a varifocal lens 6, and the diameter of a beam incident on the varifocal lens 6.

The microscope 106 can produce an effect similar to the effect of the microscope 101. In addition, the microscope 106 can compensate for deviation in a position of a laser beam due to variation in the power of the varifocal lens 6 by using the beam shifting unit 41, even when an optical axis of the varifocal lens 6 does not exactly match an illumination light axis IX. Accordingly, a laser beam can be made incident on the center of the exit pupil of the objective 10, regardless of the power of the varifocal lens 6, and a position in which the sample S is scanned can be accurately controlled.

In an IR laser for multi-photon excitation (an infrared wavelength region pulse laser), beam light shifts due to a change in a laser wavelength, restarting, or the like. The beam shifting unit 41 can adjust the shifting beam light so as to enter the center of an objective, when the beam shifting unit 41 is combined with the IR laser for multi-photon excitation. Adjustment performed by the beam shifting unit 41 can suppress beam light that enters an objective from shifting toward a position near a lens aperture in which a large spherical aberration is generated. Accordingly, the beam shifting unit 41 plays an important role to suppress brightness of an image from reducing due to an influence of a spherical aberration that changes by changing a focal position by using the varifocal lens 6.

Example 8

Figure 15:
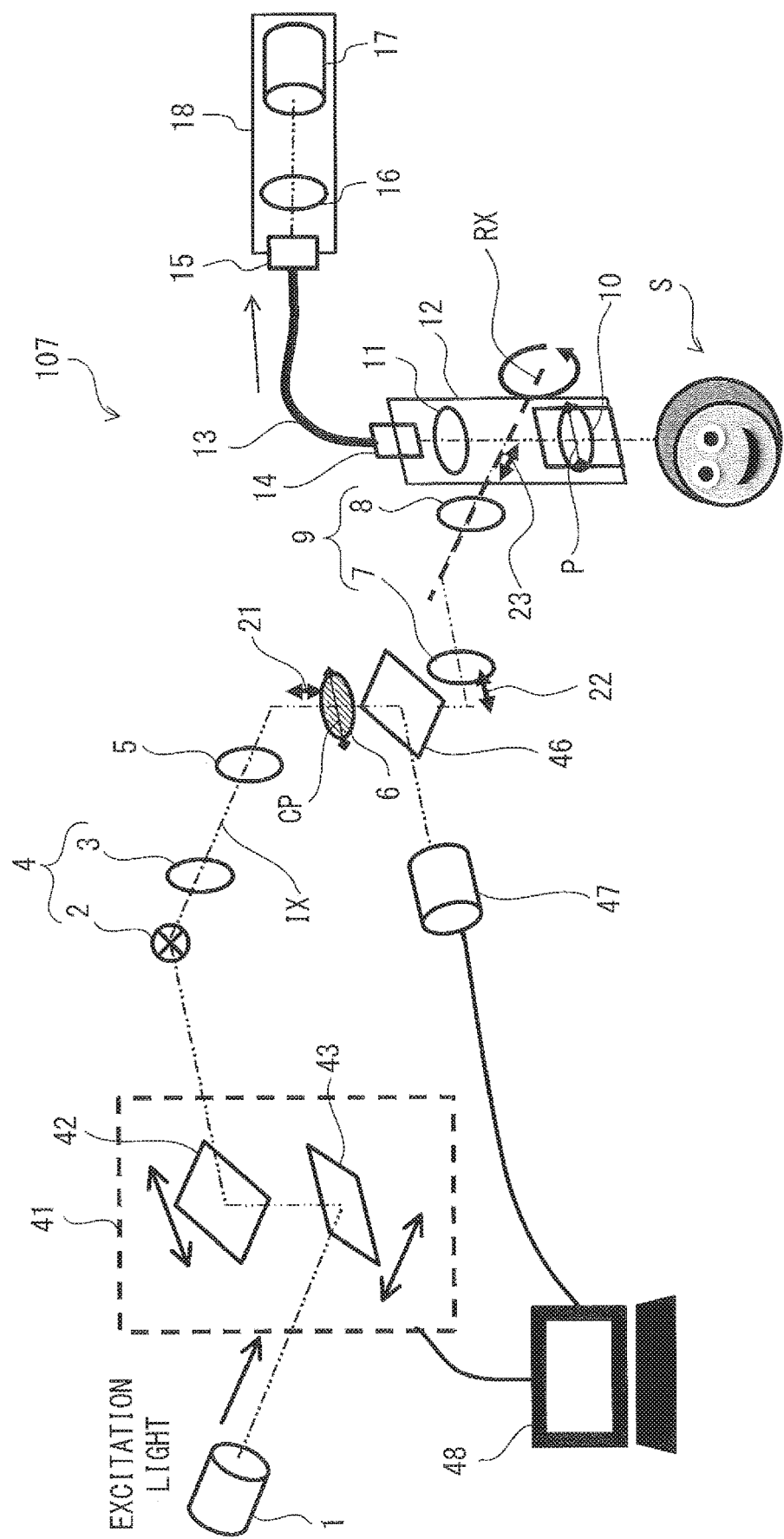
FIG. 15 illustrates the configuration of a microscope 107 in Example 8.

FIG. 15 illustrates the configuration of a microscope 107 in this example. The microscope 107 is a laser scanning microscope, and is, for example, a multi-photon excitation fluorescence microscope. The microscope 107 is different from the microscope 106 in that the microscope 107 includes a half mirror 46, a beam position detector 47, and a controller 48 instead of the controller 44 and the storing unit 45. In the other respects, the microscope 107 is similar to the microscope 106.

The half mirror 46 is a beam splitter that guides a portion of a laser beam that has passed through a varifocal lens 6 to the outside of an illumination light path, and the half mirror 46 is arranged between an objective 10 and the varifocal lens 6. The beam position detector 47 is a two-dimensional image sensor that detects a laser beam reflected by the half mirror 46, and the beam position detector 47 detects a position in which the laser beam has entered by detecting the laser beam.

The controller 48 controls a beam shifting unit 41 (a mirror 42 and a mirror 43) according to the detection result of the beam position detector 47 in such a way that a laser beam enter the center of an exit pupil of the objective 10. Namely, the controller 48 changes the positions of the mirror 42 and the mirror 43. The microscope 107 can produce an effect similar to the effect of the microscope 106.

Example 9

FIG. 16 illustrates the configuration of a microscope 108 in this example. The microscope 108 is a laser scanning microscope, and is, for example, a multi-photon excitation fluorescence microscope. The microscope 108 is different from the microscope 101 in that the microscope 108 includes a rotator 49 instead of the rotator 12 and that an adjuster 21 is arranged between an objective 10 and a dichroic mirror 33. In the other respects, the microscope 108 is similar to the microscope 101.

The rotator 49 is a rotator that rotates the objective 10, the dichroic mirror 33 (not illustrated), an incident-end condenser lens 11, a lens 8, and a mirror 32 (not illustrated) around a rotation axis RX. The rotation axis RX is a rotation axis that is orthogonal to an optical axis of the objective 10, and the rotation axis RX matches an emitted light axis of a mirror 31 (not illustrated), namely, an optical axis of a relay optical system 9 on a side of a light source 1. The rotator 49 includes a lens barrel that houses the objective 10, the dichroic mirror 33, the incident-end condenser lens 11, the lens 8, and the mirror 32. The mirror 32 and the dichroic mirror 33 are arranged in the lens barrel in such a way that a second plane that includes an incident light axis and an emitted light axis of the mirror 32 is orthogonal to a third plane that includes an incident light axis and an emitted light axis of the dichroic mirror 33. The lens barrel rotates around the rotation axis RX such that the objective 10, the dichroic mirror 33, the incident-end condenser lens 11, the lens 8, and the mirror 32 that are housed in the lens barrel also rotate around the rotation axis RX, and the orientation of the objective 10 changes.

The microscope 108 can produce an effect similar to the effect of the microscope 101. In addition, by employing the microscope 108, even when the orientation of the objective 10 changes, an orthogonal relationship between an optical axis direction of the objective 10 and a moving direction of a field of view adjusted by the adjuster 22 and the adjuster 23 is maintained. Further, the adjuster 21 is arranged between the objective 10 and the dichroic mirror 33. Therefore, an orthogonal relationship between a moving direction of a field of view adjusted by the adjuster 21 and a moving direction of the field of view adjusted by the adjuster 22 and the adjuster 23 is also maintained. Accordingly, a field of view can be easily moved three-dimensionally by the varifocal lens 6, the adjuster 21, the adjuster 22, and the adjuster 23, regardless of the orientation of the objective 10.

Example 10

Figure 17:
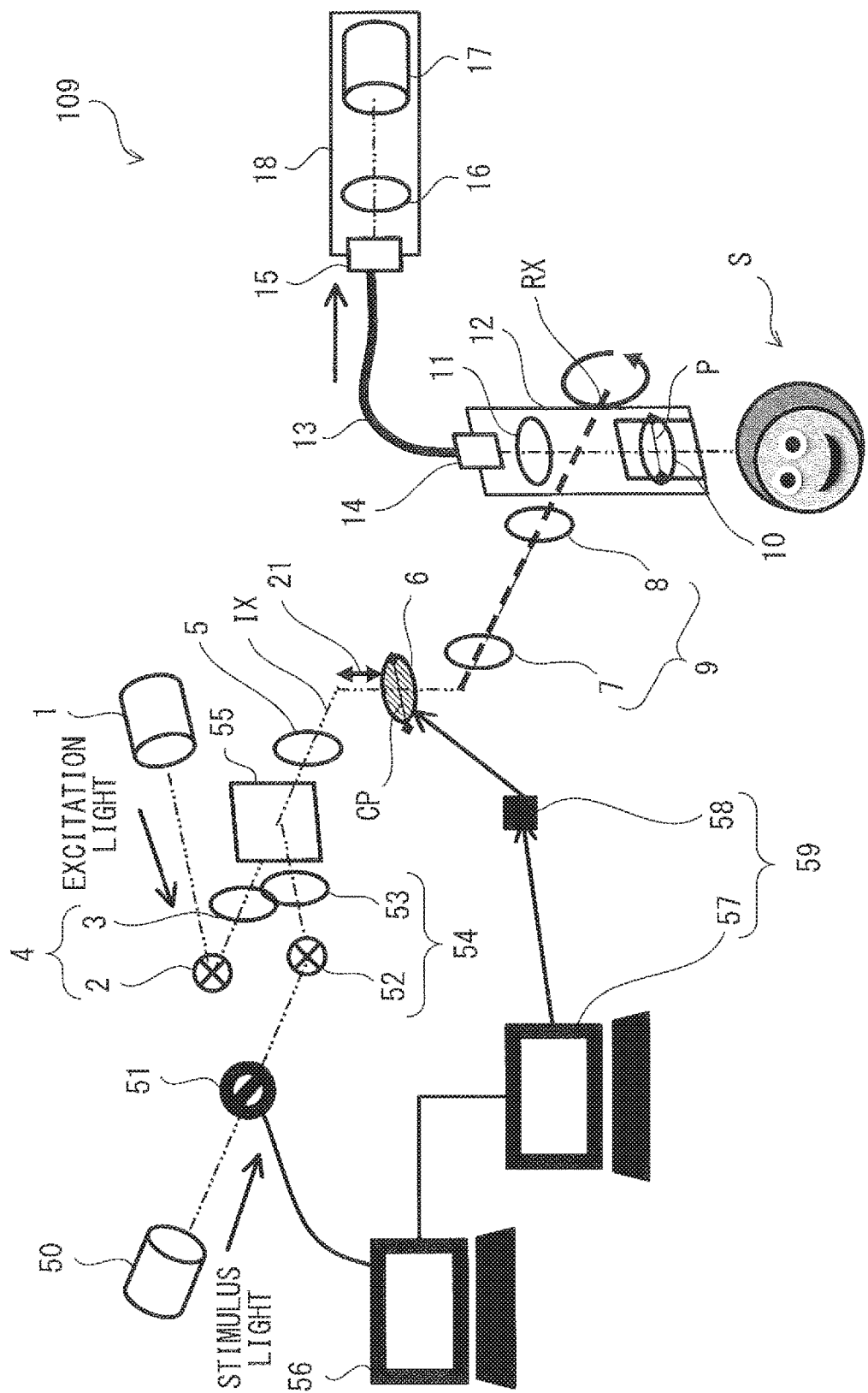
FIG. 17 illustrates the configuration of a microscope 109 in Example 10.

FIG. 17 illustrates the configuration of a microscope 109 in this example. The microscope 109 is a laser scanning microscope, and is, for example, a multi-photon excitation fluorescence microscope. The microscope 109 is different from the microscope 100 in that the microscope 109 includes a photo-stimulating unit and that the microscope 109 includes a unit that changed a focal length of a varifocal lens 6 in synchronization with switching between a state in which stimulus light is applied and a state in which excitation light is applied. Specifically, the microscope 109 is different from the microscope 100 in that the microscope 109 further includes a light source 50, an output control unit 51, a scanning unit 54, a dichroic mirror 55, a controller 56 that controls the output control unit 51, and a focal length control unit 59 that controls the varifocal lens 6. In the other respects, the microscope 109 is similar to the microscope 100. The output control unit 51 may be, for example, an acousto-optic modulator (hereinafter referred to as an AOM) or a mechanical shutter.

The light source 50 is a second light source that emits stimulus light (second illumination light) having a wavelength that is different from the wavelength of illumination light emitted from a light source 1. The output control unit 51 functions as an optical shutter under the control of the controller 56.

The scanning unit 54 includes a galvanometer mirror 52, and a pupil projection lens 53 that is arranged between the galvanometer mirror 52 and a tube lens 5 and that projects an exit pupil of an objective 10 onto or near the galvanometer mirror 52. The pupil projection lens 53 and the tube lens 5 configures a relay optical system that projects the galvanometer mirror 52 onto or near the varifocal lens 6.

The dichroic mirror 55 is a beam combiner that guides stimulus light to an illumination light path, and the dichroic mirror 55 is arranged between the light source 1 and the varifocal lens 6. The dichroic mirror 55 has a wavelength reflectance characteristic whereby stimulus light is reflected and excitation light is transmitted.

The controller 56 is a state control unit that controls the output control unit 51 so as to switch a state in which stimulus light enters the dichroic mirror 55 and a state in which the stimulus light does not enter the dichroic mirror 55.

The focal length control unit 59 includes a controller 57 and a driver 58, and the focal length control unit 59 changes a focal length of the varifocal lens 6 by a prescribed length in synchronization with the controller 56 switching a state of the output control unit 51. More specifically, based on a signal from the controller 56, the controller 57 detects that the state of the output control unit 51 has been switched. Then the controller 57 outputs, to the driver 58, a signal for changing the focal length of the varifocal lens 6, and the driver 58 changes the focal length of the varifocal lens 6.

The microscope 109 can produce an effect similar to the effect of the microscope 100. In addition, the microscope 109 can quickly change an irradiation position of light in synchronization with switching between an imaging state and a light stimulation state by changing the focal length of the varifocal lens 6 in synchronization with switching the state of the output control unit 51. Accordingly, an arbitrary position can be observed while a light stimulation position that is different from an imaging position is stimulated.

Example 11

Figure 18:
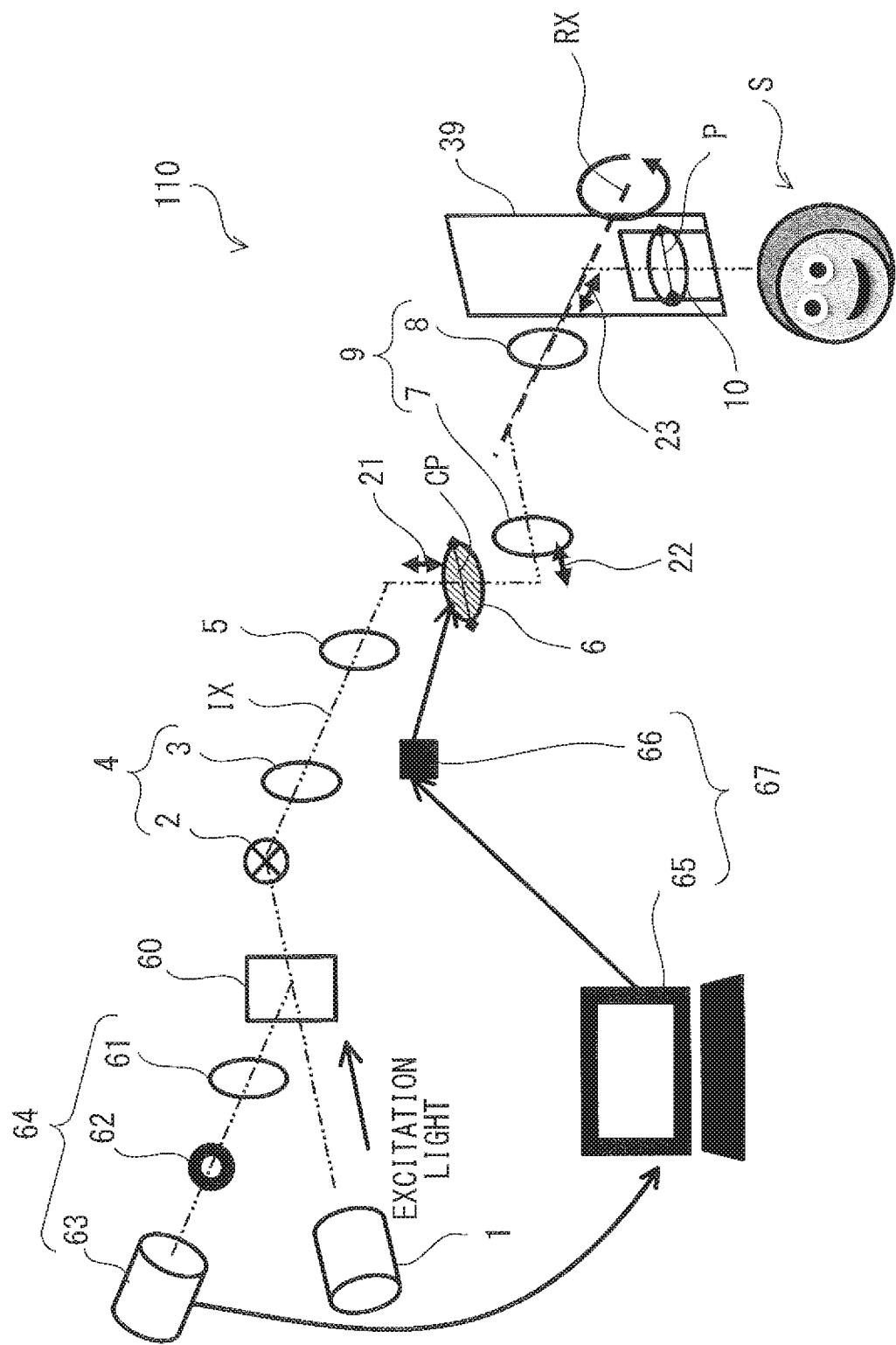
FIG. 18 illustrates the configuration of a microscope 110 in Example 11.

FIG. 18 illustrates the configuration of a microscope 110 in this example. The microscope 110 is a laser scanning microscope, and is, for example, a confocal microscope. The microscope 110 is different from the microscope 101 in that the microscope 110 includes a half mirror 60 and a confocal detection unit 64 instead of the incident-end condenser lens 11, the optical fiber 13, and the non-descanned detection unit 18.

The half mirror 60 is a reflected light splitter that is arranged between a light source 1 and a varifocal lens 6 and that guides, to the confocal detection unit 64, a laser beam that is reflected by a sample S that has been irradiated with the laser beam (hereinafter referred to as reflected light). The confocal detection unit 64 includes a confocal lens 61, a pinhole plate 62, and a photodetector 63. The confocal detection unit 64 is configured to detect reflected light that has been reflected in a condensing position of the laser beam. In the pinhole plate 62, a pinhole is formed in a rear-side focal position of the confocal lens 61. The photodetector 63 is, for example, a photomultiplier tube (PMT).

Further, the microscope 110 is different from the microscope 101 in that the microscope 110 includes a rotator 39 instead of the rotator 12 and that the microscope 110 includes a focal length control unit 67 that controls the varifocal lens 6. The rotator 39 has a configuration described above in Example 6.

The focal length control unit 67 includes a controller 65 and a driver 66. The controller 65 outputs, to the driver 66, a signal for changing a focal length of the varifocal lens 6 in accordance with a signal from the photodetector 63. The driver 66 changes the focal length of the varifocal lens 6 in accordance with the signal from the controller 65. The focal length control unit 67 may change the focal length of the varifocal lens 6, for example, in such a way that an amount of reflected light detected by the confocal detection unit 64 becomes maximum, and may further change the changed focal length of the varifocal lens 6 by a prescribed length.

The amount of reflected light detected by the confocal detection unit 64 becomes maximum on a surface of the sample S or on a surface of a cover glass placed on the sample S. Therefore, scanning is performed in an optical axis direction with reference to a position in which the amount of reflected light becomes maximum. Consequently, even when a condensing position of a laser beam changes due to environmental temperature and/or environment humidity or even when the position of a sample changes, a relative scanning position in the optical axis direction with respect to a sample surface can be stabilized.

Accordingly, the microscope 110 can stably scan a desired scanning position regardless of environmental temperature and/or environmental humidity. Further, the microscope 110 can produce an effect similar to the effect of the microscope 101.

By employing the configuration above, reflection confocal observation in which the shape of a sample is scanned by using reflected light on a sample surface can be performed. In addition, fluorescence confocal observation can be performed by arranging a dichroic mirror that transmits illumination light and reflects fluorescence, instead of the half mirror 60.

Example 12

Figure 19:
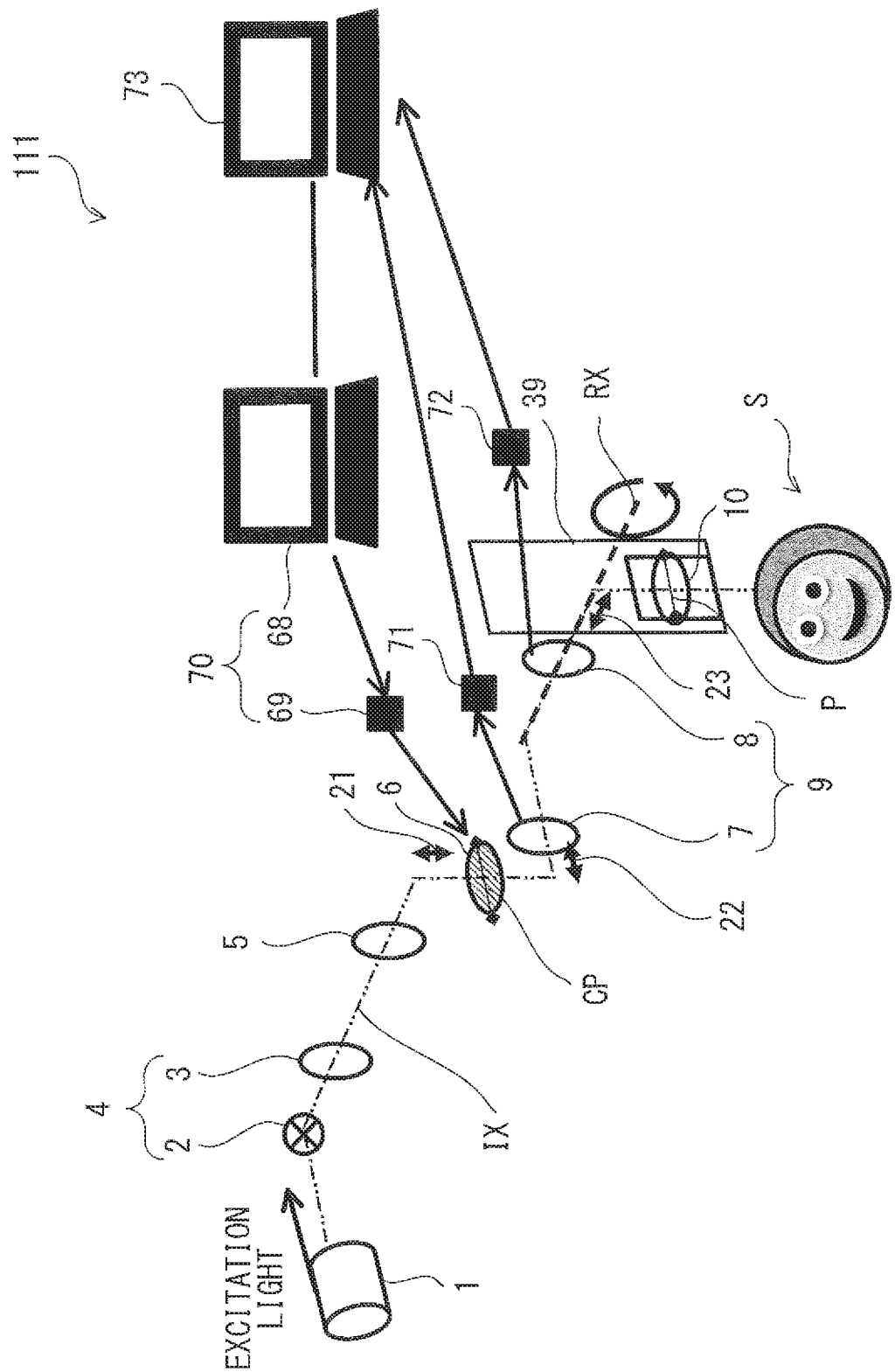
FIG. 19 illustrates the configuration of a microscope 111 in Example 12.

FIG. 19 illustrates the configuration of a microscope 111 in this example. The microscope 111 is a laser scanning microscope. The microscope 111 is different from the microscope 101 in that the microscope 111 includes a focal length control unit 70, a position detector 71, a position detector 72, and a focal length calculating unit 73. FIG. 19 illustrates an example in which a rotator 39 is included, but the microscope 111 may include an incident-end condenser lens 11, a rotator 12, an optical fiber 13, and a non-descanned detection unit 18 instead of the rotator 39, similarly to the microscope 101.

The focal length control unit 70 includes a controller 68 and a driver 69. The controller 68 outputs, to the driver 69, a signal for changing a focal length of the varifocal lens 6 in accordance with a signal from the focal length calculating unit 73. The driver 69 changes the focal length of the varifocal lens 6 in accordance with the signal from the controller 68. Specifically, the focal length control unit 70 may control the varifocal lens 6, for example, in accordance with a focal length calculated by the focal length calculating unit 73. The focal length calculating unit 73 may calculate a focal length that the varifocal lens 6 is to have in accordance with information relating to a condensing position of a laser beam that has been specified by a user. The focal length calculating unit 73 may calculate the focal length that the varifocal lens 6 is to have in accordance with a length between a mirror 31 and a mirror 32, a length between the mirror 32 and a dichroic mirror 33, and information relating to a condensing position of a laser beam that has been specified by a user. A pupil conjugate position CP changes according to the length between the mirror 31 and the mirror 32 and the length between the mirror 32 and the dichroic mirror 33. Accordingly, the focal length that the varifocal lens 6 is to have can be calculated more accurately by considering these lengths.

The microscope 111 can produce an effect similar to the effect of the microscope 101. In addition, the microscope 111 can scan the sample S in a more accurate position in an optical axis direction that corresponds to a position specified by a user.

Example 13

FIG. 20 illustrates the configuration of a microscope 112 in this example. The microscope 112 is a laser scanning microscope, and is an inverted microscope that includes an incubator 75. The microscope 112 is different from the microscope 101 in that the microscope 112 includes an inverted rotator 74 instead of the upright rotator 12. In FIG. 20, an incident-end condenser lens 11, an optical fiber 13, and a non-descanned detection unit 18 are not illustrated, but the microscope 112 may include these components.

The rotator 74 is an inverted rotator with a tip of an objective 10 facing upward, and the rotator 74 includes the objective 10 and a dichroic mirror 33 (not illustrated), and the rotator 74 rotates around a rotation axis RX that is orthogonal to an optical axis of the objective 10, similarly to the rotator 12. The incubator 75 is a device that maintains the environment of a housed biological sample in a fixed state, and the incubator 75 has, for example, a function to maintain temperature and humidity constant.

The microscope 112 can produce an effect similar to the effect of the microscope 101. By employing the microscope 112, a wide range within the incubator 75 can be observed by moving a field of view by using an adjuster 21, an adjuster 22, and an adjuster 23. Further, the microscope 112 does not need a driving mechanism such as a motor around the microscope 110, and therefore a bad influence of heat generation of a driving mechanism on the incubator 75 can be prevented.

Example 14

FIG. 21 illustrates the configuration of a microscope 113 in this example. The microscope 113 is a laser scanning microscope, and is, for example, a multi-photon excitation fluorescence microscope. The microscope 113 is different from the microscope 100 in that the microscope 113 includes a power monitor 76 and a focal length control unit 79.

The power monitor 76 is a device that monitors the power of a varifocal lens 6. The power monitor 76 may be, for example, a device that irradiates the surface of the varifocal lens 6 with light, and that specifies the shape (power) of the varifocal lens 6 on the basis of a position in which reflected light is detected.

The focal length control unit 79 includes a controller 77 and a driver 78. The controller 77 outputs, to the driver 78, a signal for changing a focal length of the varifocal lens 6 in accordance with a signal from the power monitor 76. The driver 78 changes the focal length of the varifocal lens 6 in accordance with the signal from the controller 77. Specifically, the focal length control unit 79 may control the varifocal lens 6, for example, according to the power monitored by the power monitor 76 in such a way that the power of the varifocal lens 6 is maintained constant. Namely, the focal length control unit 79 may function as a power stabilizing unit relating to the varifocal lens 6. A focal length of a varifocal lens using liquid varies according to environmental temperature, and therefore a condensing position on a sample plane changes. Accordingly, the configuration above in which the focal length control unit 79, which functions as a power stabilizing unit, controls a varifocal lens is effective.

The microscope 113 can produce an effect similar to the effect of the microscope 100. In addition, by employing the microscope 113, the power of the varifocal lens 6 can be suppressed from varying due to a change in environment such as temperature.

Example 15

FIG. 22 illustrates the configuration of a microscope 114 in this example. The microscope 114 is a wide field type fluorescence microscope. The microscope 114 includes a light source 80 that is a lamp light source. Examples of the light source 80 include a mercury lamp and a xenon lamp. Illumination light emitted from the light source 80 enters a varifocal lens 6 via a lens 81, a lens 82, and a dichroic mirror 85. A configuration from the varifocal lens 6 to an objective 10 is similar to the configuration in the microscope 105 in Example 6. Fluorescence that has been generated in a sample S due to irradiation of the illumination light enters the dichroic mirror 85 via the objective 10 and the varifocal lens 6. The dichroic mirror 85 has a wavelength reflectance characteristic whereby illumination light is reflected and fluorescence is transmitted. Accordingly, fluorescence is transmitted through the dichroic mirror 85, and enters a tube lens 83, and the tube lens 83 forms an image of the sample S in a camera 84.

The microscope 114 generates plural pieces of two-dimensional image data for different depths by changing a focal length of the varifocal lens 6 and scanning the sample S in an optical axis direction. By doing this, three-dimensional information of the sample S can be obtained from the plural pieces of two-dimensional image data, similarly to the microscope 100, and therefore the sample S can be observed three-dimensionally. By employing the microscope 114, the sample S can be easily observed from various directions by changing the orientation of the objective 10, the speeding-up of scanning in the optical axis direction can be realized, vibration due to scanning in the optical axis direction can be greatly suppressed from occurring, and accurate scanning in the optical axis direction can be realized, similarly to the microscope 100.

The examples above give specific examples in order to easily understand the invention, and the present invention is not limited to the examples above. Various variations or modifications to the microscopes can be made without departing from the scope of the present invention specified in the claims. Some features in the contexts of individual examples described herein may be combined such that a single example is implemented. As an example, Examples 6, 10, 14, and 15 describe an example in which a microscope does not include the adjuster 22 and the adjuster 23 that adjust a length between reflection optical systems in a direction orthogonal and a vertical direction; however, the microscope may be varied so as to include the first to third reflection optical systems, the adjuster 22, and the adjuster 23. In addition, in Examples 1, 2, 3, 4, and 5, an optical system using an optical fiber is used to detect fluorescence, but a dichroic mirror can be arranged between a tube lens and a varifocal lens, fluorescence from an objective can be reflected by the dichroic mirror, and the fluorescence can be detected. Further, FIGS. 1 and 3 illustrate a mirror (the mirrors 19, 20, 31, and 32, and the dichroic mirror 33) that bends an optical axis, but other drawings (FIGS. 6, 9, 11, 13, 14, 15, 16, 17, 18, 19, 20, 21, 22, and the like) only illustrate that an optical axis is bent, and a mirror is appropriately omitted.

What is claimed is:

1. A microscope comprising:
a light source that emits illumination light;
an objective that the illumination light enters;
a varifocal optical system that is arranged on an illumination light path between the objective and the light source;
a reflection optical system that deflects an illumination light axis of the illumination light toward an optical axis of the objective, the reflection optical system being arranged on an illumination light path between the varifocal optical system and the objective;
a rotator that integrally rotates the objective and the reflection optical system around a rotation axis that is orthogonal to the optical axis of the objectives;
a first reflection optical system, a second reflection optical system, and a third reflection optical system that are arranged in order of proximity to the varifocal optical system on the illumination light path between the varifocal optical system and the objective, each of the first reflection optical system, the second reflection optical system, and the third reflection optical system changing a direction of the illumination light axis, and the third reflection optical system being the reflection optical system;
a first adjuster that adjusts a length between the first reflection optical system and the second reflection optical system; and
a second adjuster that adjusts a length between the second reflection optical system and the third reflection optical system.

2. The microscope according to claim 1, wherein:
the varifocal optical system comprises a fluid lens, and
the varifocal optical system is arranged in such a way that an optical axis of the varifocal optical system faces a vertical direction when the microscope is arranged on a horizontal plane.

3. The microscope according to claim 1, wherein each of the first reflection optical system, the second reflection optical system, and the third reflection optical system changes the direction of the illumination light axis in such a way that an incident light axis and an emitted light axis are orthogonal to each other.

4. The microscope according to claim 3, wherein the first reflection optical system and the second reflection optical system are arranged in such a way that a first plane is orthogonal to a second plane, the first plane including the incident light axis and the emitted light axis of the first reflection optical system, and the second plane including the incident light axis and the emitted light axis of the second reflection optical system.

5. The microscope according to claim 3, wherein the second reflection optical system and the third reflection optical system are arranged in such a way that a second plane is orthogonal to a third plane, the second plane including the incident light axis and the emitted light axis of the second reflection optical system, and the third plane including the incident light axis and the emitted light axis of the third reflection optical system.

6. The microscope according to claim 3, further comprising:
a scanning unit that scans a sample in a direction that is orthogonal to the optical axis of the objective by using the illumination light, the scanning unit being arranged between the light source and the varifocal optical system; and
a tube lens that is arranged between the scanning unit and the varifocal optical system.

7. The microscope according to claim 6, wherein the scanning unit comprises a rotary disk in which an aperture is formed, the scanning unit being arranged on a focal plane of the tube lens on a side of the light source.

8. The microscope according to claim 6, wherein the scanning unit includes:
a scanner; and
a pupil projection lens that projects an exit pupil of the objective onto or near the scanner, the pupil projection lens being arranged between the scanner and the tube lens.

9. The microscope according to claim 8, further comprising:
a beam shifting unit that shifts the illumination light, the beam shifting unit being arranged between the light source and the scanning unit; and
a shift control unit that controls the beam shifting unit in such a way that the illumination light enters a center of the exit pupil of the objective.

10. The microscope according to claim 9, further comprising:
a storing unit that stores setting information of the beam shifting unit for each combination of a wavelength of the illumination light, a focal length of the varifocal optical system, and a diameter of a beam that enters the varifocal optical system,
wherein the shift control unit controls the beam shifting unit according to the setting information stored in the storing unit in such a way that the illumination light enters the center of the exit pupil of the objective.

11. The microscope according to claim 9, further comprising:
a beam position detector that detects a position of incident light, the beam position detector being arranged outside the illumination light path; and
a beam splitter that guides, to the beam position detector, a portion of the illumination light that has passed through the varifocal optical system, the beam splitter being arranged between the objective and the varifocal optical system,
wherein the shift control unit controls the beam shifting unit according to a detection result of the beam position detector in such a way that the illumination light enters the center of the exit pupil of the objective.

12. The microscope according to claim 8, further comprising:
a fluorescence splitter that splits the illumination light from fluorescence, the fluorescence splitter being arranged between the objective and the varifocal optical system; and
a non-descanned detection unit that detects the fluorescence split by the fluorescence splitter.

13. The microscope according to claim 12, wherein:
the fluorescence splitter is the third reflection optical system, and
the third reflection optical system has a wavelength reflectance characteristic whereby the fluorescence is transmitted.

14. The microscope according to claim 6, further comprising:
a relay optical system that projects the varifocal optical system in or near an exit pupil position of the objective, wherein:
the relay optical system includes:
a first lens group that has a positive power; and
a second lens group that has a positive power, the second lens group having a focal position on a side of the light source in a focal position of the first lens group on a side of the objective,
the first adjuster is arranged between the first reflection optical system and the first lens group, and
the second adjuster is arranged between the second lens group and the third reflection optical system.

15. The microscope according to claim 14, wherein:
the varifocal optical system has a focal length that is variable within a range from a negative value to a positive value, and
a focal length of the first lens group is equal to a focal length of the second lens group.

16. The microscope according to claim 14, further comprising:
a forward offset lens group that has a negative focal length, the forward offset lens group being arranged between the scanning unit and the varifocal optical system,
wherein when f1 is a focal length of the first lens group, f2 is a focal length of the second lens group, fo is a focal length of the forward offset lens group, and fv is a focal length of the varifocal optical system when a focal position of the forward offset lens group on a side of the scanning unit matches a focal position of the varifocal optical system on the side of the scanning unit, a following conditional expression is satisfied:

$-fv/fo \times f2/f1=1$.

17. The microscope according to claim 6, further comprising:
a relay optical system that projects the varifocal optical system in or near an exit pupil position of the objective, wherein:
the relay optical system includes:
a backward offset lens group that has a negative focal length, the backward offset lens group being arranged between the varifocal optical system and the objective;
a first lens group that has a positive power; and
a second lens group that has a positive power, the second lens group having a focal position on a side of the light source in a focal position of the first lens group on a side of the objective,
the first adjuster is arranged between the varifocal optical system and the first lens group,
the second adjuster is arranged between the second lens group and the third reflection optical system, and
when f1 is a focal length of the first lens group, f2 is a focal length of the second lens group, fo is a focal length of the backward offset lens group, and fv is a focal length of the varifocal optical system when a focal position of the backward offset lens group on the side of the objective matches a focal position of the varifocal optical system on the side of the objective, a following conditional expression is satisfied:

$-fo/fv \times f2/f1=1$.

18. The microscope according to claim 6, further comprising:
a relay optical system that has a positive power, the relay optical system projecting the varifocal optical system in or near an exit pupil position of the objective, wherein:
the first adjuster is arranged between the relay optical system and the second reflection optical system, and
the second adjuster is arranged between the second reflection optical system and the third reflection optical system.

19. The microscope according to claim 18, wherein the relay optical system projects the varifocal optical system in or near the exit pupil position of the objective with no magnification.

20. The microscope according to claim 3, wherein the rotation axis matches the emitted light axis of the first reflection optical system or the emitted light axis of the second reflection optical system.

21. The microscope according to claim 3, further comprising:
a second light source that emits second illumination light that has a wavelength different from the wavelength of the illumination light;
a beam combiner that guides the second illumination light to the illumination light path, the beam combiner being arranged between the light source and the varifocal optical system;
a state control unit that switches a state in which the second illumination light enters the beam combiner and a state in which the second illumination light does not enter the beam combiner; and
a focal length control unit that controls the varifocal optical system,
wherein the focal length control unit changes a focal length of the varifocal optical system by a fixed length in synchronization with switching of the state by the state control unit.

22. The microscope according to claim 3, further comprising:
a confocal detection unit that detects reflected light that has been reflected in a condensing position of the illumination light;
a reflected light splitter that guides, to the confocal detection unit, the reflected light reflected by a sample that is irradiated with the illumination light, the reflected light splitter being arranged between the light source and the varifocal optical system; and
a focal length control unit that controls the varifocal optical system,
wherein the focal length control unit changes a focal length of the varifocal optical system in such a way that an amount of the reflected light detected by the confocal detection unit becomes maximum, and further changes the changed focal length of the varifocal optical system by a fixed length.

23. The microscope according to claim 3, further comprising:
a focal length calculating unit that calculates a focal length that the varifocal optical system is to have in accordance with information relating to a condensing position of the illumination light, the condensing position having been specified by a user; and
a focal length control unit that controls the varifocal optical system according to the focal length calculated by the focal length calculating unit.

24. The microscope according to claim 23, wherein the focal length calculating unit calculates the focal length that the varifocal optical system is to have in accordance with a length between the first reflection optical system and the second reflection optical system, a length between the second reflection optical system and the third reflection optical system, and the information relating to the condensing position of the illumination light, the condensing position having been specified by the user.

25. The microscope according to claim 3, further comprising:
   an incubator that maintains an environment of a housed biological sample in a fixed state.

26. The microscope according to claim 1, further comprising:
   a monitor that monitors power of the varifocal optical system; and
   a power stabilizing unit that controls the varifocal optical system according to the power monitored by the monitor in such a way that the power of the varifocal optical system is maintained to be constant.

* * * * *